United States Patent [19]
Johnson et al.

[11] Patent Number: 5,113,519
[45] Date of Patent: May 12, 1992

[54] INTENANCE OF FILE ATTRIBUTES IN A DISTRIBUTED DATA PROCESSING SYSTEM

[75] Inventors: Donavon W. Johnson, Georgetown, Tex.; Stephen P. Morgan, Mahopac, N.Y.; Todd A. Smith, Austin, Tex.

[73] Assignee: International Business Machines Corporation, Armonk, N.Y.

[21] Appl. No.: 352,090

[22] Filed: May 15, 1989

[51] Int. Cl.$^5$ .................................... G06F 15/16
[52] U.S. Cl. ...................... 395/600; 364/DIG. 1; 364/282.4; 364/282.1; 364/283.1; 364/284; 364/280; 364/280.6
[58] Field of Search ... 364/200 MS File, 900 MS File

[56] References Cited

U.S. PATENT DOCUMENTS

| | | | |
|---|---|---|---|
| 4,432,057 | 2/1984 | Daniell et al. | 364/300 |
| 4,558,413 | 12/1985 | Schmidt et al. | 364/300 |
| 4,620,276 | 10/1986 | Daniell et al. | 364/200 |
| 4,621,321 | 11/1986 | Boebert et al. | 364/200 |
| 4,825,354 | 4/1989 | Agrawal et al. | 364/200 |
| 4,887,204 | 12/1989 | Johnson et al. | 364/200 |
| 4,888,726 | 12/1989 | Struger et al. | 364/900 |
| 4,897,781 | 1/1990 | Chang et al. | 364/200 |
| 5,053,945 | 10/1991 | Whisler | 364/200 |

OTHER PUBLICATIONS

J. H. Howard et al., "Scale and Performance in a Distributed File System", ACM Transactions on Computer Systems, vol. 6, No. 1, 1988, pp. 51-81.
Kleiman, S. R., "Vnodes: An Architecture for Multiple File System Types in Sun Unix", pp. 238-247.
Sandberg, R. et al., "Design and Implementation of the Sun Network Filesystem", pp. 119-130.
Walsh, Dan et al., "Overview of the Sun Network File System", pp. 117-124.
Chang, JoMei, "Status Monitor Provides Network Locking Service for NFS", pp. 1-3.
Chang, JoMei, "SunNet", pp. 71-75.
Taylor, Bradley, "Secure Networking in the Sun Environment", pp. 28-36.
Rifkin et al., "RFS Architectural Overview", pp. 1-12.
Hamilton, Richard et al., "An Administrator's View of Remote File Sharing", pp. 1-9.
Houghton, Tom et al., "File System Switch", pp. 1-2.
Olander, David J. et al., "A Framework for Networking in System V", pp. 1-8.

*Primary Examiner*—Kevin A. Kriess
*Attorney, Agent, or Firm*—Wayne P. Bailey; Marilyn D. Smith

[57] ABSTRACT

The system and method of this invention maintains the latest file attributes such as file size, modify time, and access time, at the server data processing system in a distributed data processing system. The server data processing system combines information requested from the client data processing system that has permission to write to the file with information periodically received from other client data processing systems that may be extending the same file by mapping the file into their own virtual address space. In this way, the server can maintain the latest file size attribute even when some clients are extending the file through system calls and other clients are extending the file through mapped access. To maintain a latest modify time and access time, the server keeps a modify count and access count. The client data processing systems periodically send to the server data processing the modify count and access count that have been incremented whenever the client data processing system modifies and accesses the file. The server data processing system compares the counts at the server with the counts received from the clients to determine a latest corresponding modify time and access time.

25 Claims, 16 Drawing Sheets

INTENANCE OF FILE ATTRIBUTES IN A DISTRIBUTED DATA PROCESSING SYSTEM

CROSS-REFERENCES TO RELATED APPLICATIONS

U.S. application Ser. No. 07/014,897 filed Feb. 13, 1987, in the name of Johnson et al for "A System And Method for Accessing Remote Files In A Distributed Networking Environment", herein incorporated by reference.

U.S. application Ser. No. 07/717,450 filed Jun. 19, 1991, in the name of Morgan et al for "File Extension By Clients In A Distributed Data Processing System", herein incorporated by reference, which is a continuation of U.S. application Ser. No. 07/352,220, now abandoned.

U.S. application Ser. No. 07/352,075 filed May 15, 1989, in the name of Johnson et al for "Remote Authentication And Authorization In A Distributed Data Processing System", herein incorporated by reference.

U.S. application Ser. No. 07/751,603 filed Aug. 21, 1991, in the name of Loucks et al for "A Flexible Interface To Authentication Services In A Distributed Data Processing System", herein incorporated by reference, which is a continuation of U.S. application Ser. No. 07/352,518, now abandoned.

U.S. application Ser. No. 07/352,080 filed May 15, 1989, in the name of D.W. Johnson et al for "File Lock Management In A Distributed Data Processing System", herein incorporated by reference.

U.S. application Ser. No. 07/352,084 filed May 15, 1989, in the name of D.W. Johnson et al for "System and Method For Efficient Control Of Cached Data In A Distributed Data Processing System", herein incorporated by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to a plurality of data processing systems connected by a communications link, and more particularly to the accessing of files between local and remote processing systems in a distributed networking environment.

2. Description of the Related Art

As shown in FIG. 1, a distributed networking environment 1 consists of two or more nodes A, B, C, connected through a communication link or a network 3. The network 3 can be either a local area network (LAN), or a wide area network (WAN).

At any of the nodes A, B, C, there may be a processing system 10A, 10B, 10C, such as a workstation. Each of these processing systems 10A, 10B, 10C, may be a single user system or a multi-user system with the ability to use the network 3 to access files located at a remote node. For example, the processing system 10A at local node A, is able to access the files 5B, 5C at the remote nodes B, C, respectively.

Within this document, the term "server" will be used to indicate the processing system where the file is permanently stored, and the term "client" will be used to mean any other processing system having processes accessing the file. It is to be understood, however, that the term "server" does not mean a dedicated server as that term is used in some local area network systems. The distributed services system in which the invention is implemented is truly a distributed system supporting a wide variety of applications running at different nodes in the system which may access files located anywhere in the system.

As mentioned, the invention to be described hereinafter is directed to a distributed data processing system in a communication network. In this environment, each processor at a node in the network potentially may access all the files in the network no matter at which nodes the files may reside.

Other approaches to supporting a distributed data processing system are known. For example, IBM's Distributed Services for the AIX operating system is disclosed in Ser. No. 014,897 "A System and Method for Accessing Remote Files in a Distributed Networking Environment ", filed Feb. 13, 1987 in the name of Johnson et al. In addition, Sun Microsystems has released a Network File System (NFS) and Bell Laboratories has developed a Remote File System (RFS). The Sun Microsystems NFS has been described in a series of publications including S.R. Kleiman, "Vnodes: An Architecture for Multiple File System Types in Sun UNIX", *Conference Proceedings, USENIX 1986 Summer Technical Conference and Exhibition*, pp. 238 to 247; Russel Sandberg et al., "Design and Implementation of the Sun Network Filesystem", *Conference Proceedings, Usenix 1985*, pp. 119 to 130; Dan Walsh et al., "Overview of the Sun Network File System", pp. 117 to 124; JoMei Chang, "Status Monitor Provides Network Locking Service for NFS", JoMei Chang, "SunNet", pp. 71 to 75; and Bradley Taylor, "Secure Networking in the Sun Environment", pp. 28 to 36. The AT&T RFS has also been described in a series of publications including Andrew P. Rifkin et al., "RFS Architectural Overview", *USENIX Conference Proceedings*, Atlanta, Ga. (June 1986), pp. 1 to 12; Richard Hamilton et al., "An Administrator's View of Remote File Sharing", pp. 1 to 9; Tom Houghton et al., "File Systems Switch", pp. 1 to 2; and David J. Olander et al., "A Framework for Networking in System V", pp. 1 to 8.

One feature of the distributed services system in which the subject invention is implemented which distinguishes it from the Sun Microsystems NFS, for example, is that Sun's approach was to design what is essentially a stateless server. This means that the server does not store any information about client nodes, including such information as which client nodes have a server file open or whether client processes have a file open in read_only or read_write modes. Such an implementation simplifies the design of the server because the server does not have to deal with error recovery situations which may arise when a client fails or goes off-line without properly informing the server that it is releasing its claim on server resources.

An entirely different approach was taken in the design of the distributed services system in which the present invention is implemented. More specifically, the distributed services system may be characterized as a "stateful implementation". A "stateful" server, such as that described here, does keep information about who is using its files and how the files are being used. This requires that the server have some way to detect the loss of contact with a client so that accumulated state information about that client can be discarded. The cache management strategies described here cannot be implemented unless the server keeps such state information.

The problems encountered in accessing remote nodes can be better understood by first examining how a stand-alone system accesses files. In a stand alone system, such as 10 as shown in FIG. 2, a local buffer 12 in the operating system 11 is used to buffer the data transferred between the permanent storage 2, such as a hard file or a disk in a workstation, and the user address space 14. The local buffer 12 in the operating system 11 is also referred to as a local cache or kernel buffer.

In the stand-alone system, the kernel buffer 12 is divided into blocks 15 which are identified by device number, and logical block number within the device. When a read system call 16 is issued, it is issued with a file descriptor of the file 5 for a byte range within the file 5, as shown in step 101, FIG. 3. The operating system 11 takes this information and converts it to device number, and logical block numbers in the device, step 102, FIG. 3. If the block is in the cache, step 103, the data is obtained directly from the cache, step 105. In the case where the cache doesn't hold the sought for block at step 103, the data is read into the cache in step 104 before proceeding with step 105 where the data is obtained from the cache.

Any data read from the disk 2 is kept in the cache block 15 until the cache block 15 is needed for some other purpose. Consequently, any successive read requests from an application 4 that is running on the processing system 10 for the same data previously read is accessed from the cache 12 and not the disk 2. Reading from the cache is far less time consuming than reading from the disk.

Similarly, data written from the application 4 is not saved immediately on the disk 2, but is written to the cache 12. This saves disk accesses if another write operation is issued to the same block. Modified data blocks in the cache 12 are saved on the disk 2 periodically.

Use of a cache in a stand-alone system that utilizes an AIX operating system improves the overall performance of the system since disk accessing is eliminated for successive reads and writes. Overall performance is enhanced because accessing permanent storage is slower and more expensive than accessing a cache.

As described above, local buffers in the operating system can be used to improve the performance of stand-alone access to files. These local buffers are kept in fast memory while files are usually kept in slower permanent storage such as disk drives. Larger buffer caches can enhance a data processing system's performance because the cache can hold more of the data belonging to the system's files and hence will reduce the need to use the slower disk drives. A system's physical fast memory is of limited size. Rather than partitioning physical memory by setting aside a fixed fraction for the operating system's kernel buffers, virtual memory techniques can be used to speed up the access to system's disk files. In this virtual memory technique, there is no fixed cache of disk blocks. Instead, data is cached in virtual not physical memory.

Virtual memory provides memory space larger than the available physical memory. This virtual memory space is divided into pages and used by programs as if the virtual memory space was true physical memory. A system's virtual memory pages reside in either actual physical memory frames, disk blocks, or both. Whenever a virtual memory page is not present in a physical frame, any attempt to use that page will result in a exception known as a page fault. The program attempting to use such a page generates a page fault and is temporarily suspended while the virtual memory page is retrieved from the disk block where it currently resides and is copied into a physical memory frame. After the virtual memory page has been assigned a physical frame, the original faulting program can be allowed to continue and it will now find that the data in that virtual memory page is available.

Another way to take advantage of the flexibility provided by virtual memory is to allow processes to map files into their virtual address space. In this way, a process can access the contents of a file without executing a read or write system call. The reading and writing of a file is performed, but it is performed by the virtual memory manager in response to the processes' loads and stores executed against those addresses within its address space where the file has been mapped into. As an example, a short file of 100 bytes might be mapped into a range of addresses from 4,800–4,899. When the process loads a byte from location 4,805, the process would be obtaining the byte at offset 5 within the file. When the process stored to location 4,800, the process would be changing the contents of the byte at offset 0, i.e. the first byte of the file. This allows a process to access and modify the contents of the file without any read or write system calls.

As illustrated in FIG. 2B, a store to a memory segment 91 which contains a mapped file 92 might extend the file 92, but file system logic 93 is not invoked for each store. Therefore, if an application 94 maps a file and extends the file with stores, the file size attribute in the inode data structure 95 is not synchronously updated. At any particular instant the file system's opinion of the file's size (the size stored in the inode) may not be up to date with the most recent virtual memory stores. The inode 95, which is a data structure containing information for the file 92, is brought up to date by system calls such as sync, fsync, close, and by periodic sync operations performed by the operating system 96. When a file is modified by traditional system calls (e.g. write), the file system logic 93 is invoked and it uses mapped file stores to update the file's data. The file system logic 93 knows, via the system call's parameters, what is being done to the file and thus updates the file size found in the inode data structure 95 synchronously. The stat system call returns the current inode file size value; it does not query the virtual memory manager 97. The result is that if a file 92 is operated on exclusively by system calls, then the file size found in the inode data structure 95 and returned by stat is always up to date. However, if the file is operated on by mapped stores, then the file size returned by stat may not reflect the results of the most recent stores. Applications 94 which use mapped access (rather than system calls) may issue fsync if they want to insure that an ensuing stat will reflect their most recent modifications. If an application extends a file 92 with stores (as opposed to system calls) the virtual memory manager 97 knows which page is the "rightmost" page of the file, but it doesn't know which byte within that page holds the last byte of the file. When system calls are used, however, the file system knows, with byte granularity, the size of the file.

In a distributed environment, as shown in FIG. 1, there are two ways the processing system 10C in local node C could read the file 5A from node A. In one way, the processing system 10C could copy the whole file 5A, and then read it as if it were a local file 5C residing at node C. Reading a file in this way creates a problem if another processing system 10A at another node A modifies the file 5A after the file 5A has been copied at node C as file 5C. The processing system 10C would not have access to these latest modifications to the file 5A.

Another way for processing system 10C to access a file 5A at node A is to read one block, e.g. N1, at a time as the processing system at node C requires it. A problem with this method is that every read has to go across the network communication link 3 to the node A where the file resides. Sending the data for every successive read is time consuming.

Accessing files across a network presents two competing problems as illustrated above. One problem involves the time required to transmit data across the network for successive reads and writes. On the other hand, if the file data is stored in the node to reduce network traffic, the file integrity may be lost. For example, if one of the several nodes is also writing to the file, the other nodes accessing the file may not be accessing the latest updated data that has just been written. As such, the file integrity is lost since a node may be accessing incorrect and outdated files.

In addition to the difficulty of managing the data belonging to a file in a distributed environment, there is a problem of managing the attributes of a file that is being accessed in a distributed processing environment. Files have three important attributes that change frequently; the file size, the time of last modification, and the time of last access to the file. Each time a process appends data to the end of a file, the file size changes along with the time of last modification and the time of last access. Each time a file is read by a process, the time of last access changes.

One way to maintain this information accurately is to maintain the information at the file server. Each time a file is accessed or a file size is changed by a client, the client sends a message to the server informing the server of the changes. Each time an attribute is required by a client, the client sends a message to the server requesting the values of the attributes. This solution maintains the correct file attributes, but at too high of a cost of performance requiring a messages to and from the server each time a file is read or written at any client machine.

On the other hand, if the attributes are kept at the client machines, the server and other clients in the distributed environment will not have the correct values of the attributes. Since multiple clients may be accessing the file at the same time, inconsistent values of the attributes may exist at the various clients at the same time.

An additional complication is introduced by allowing processes to map files to their virtual address space. When this is done, a process can manipulate the contents of a file, possible changing its size and the time that it was last accessed or modified, without using a system call such as read or write. This access occurs through load and store instructions. In this type of situation, the operating system has no opportunity to keep track of the time of last access and the other file attributes as it had with system calls. Likewise, in a distributed environment, which allows processes to map remote files into their virtual address space, these complications exist if useful file attributes are to be maintained.

SUMMARY OF THE INVENTION

It is therefore an object of this invention to maintain file attributes such as the size, the time of last modification, and the time of last access, in such a way that the file attributes are accurate and available at all clients in a distributed processing environment.

It is therefore a further object of this invention to accurately maintain the file attributes without undue overhead, performance cost, and network traffic.

The system and method of this invention provides a protocol which allows processes in a distributed environment to access a file either through system calls, e.g. read and write, or through a mechanism that maps the file to their own address space such that the attributes of the files are efficiently and accurately distributed to all of the interested processes.

The attributes of the file, such as the file size attribute, the modify time attribute, and the last access time attribute, are each managed separately and independently from each of the other attributes in the distributed environment.

The file size attribute is managed in the following manner. Clients that perform read or write system calls obtain permission to do so from the server of the file by requesting one of the file's read tokens or the file's write token. In addition to providing permission to perform the operation on the file, the tokens also contain the current size of the file. Since only one client can have the write token at a time, only processes at the client with the write token can be writing to the file, the file size can be kept in the write token. Changes in the file size due to write system calls can be reflected by updating the size kept at the write token.

Processes which access the file through mapping the file into their own virtual address space, may extend the file and change its size without acquiring the write token. These changes to the size of the file are propagated to the server periodically to ensure that the server's size for the file is never too out of date. When any process in the network is interested in the file size, the process sends a get_attr message to the server which then interrogates the node that has the write token and combines that with the information that the server has from clients who have processes that have extended the file through mapping the file. The server returns to the requesting client the file size which reflects the best available information on the current size of the file.

The maintenance of the modify time and the access time is performed in a manner similar to the maintenance of the file size attribute as already described. These attributes are kept in the read and write tokens.

For the modify time attribute, the write token is used to manage the modify time attribute according to the following rules. The server keeps track of the modify count for the file. When the client gets the write token, it gets the modify count also. When a client modifies the file, the client increments the modify count. When a server wants to determine if a file has been modified, the server sends a special revoke token message causing the client to send back to the server the modify count. The server compares the modify count from the client (which may have been incremented) with the modify count at the server to determine if the file has been modified while the client had the write token. If the server determines that the file has been modified, the server sets the modify time to the current time.

It is less critical that a client know when the last time a file was accessed. Since many clients may have the read token, it would be too burdensome to query each client that has the read token their time of last access. Instead, the requesting client only queries the server for the time of last access by any client. The server can determine the time of last access because the clients having the read token are required to periodically inform the server of any access to the file.

DESCRIPTION OF THE PREFERRED EMBODIMENT

With reference to FIGS. 4A-4I, the internode messages used herein are described.

Figure 4A:
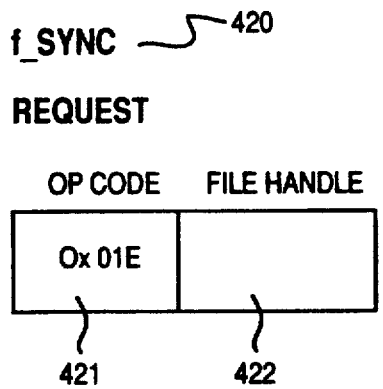
FIG. 4A is the data structure of a $f_{13}$ sync message for synchronizing the file information at the server with the file information at the client.
Figure 4A:
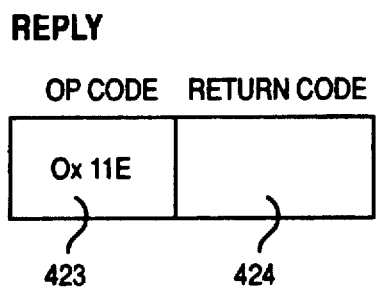

FIG. 4A shows the f_sync message 420 which is used to synchronize the server's knowledge of the file with the client's. In response to a f_sync message from a client, the server performs a f_sync operations. The f_sync operation causes the server to write all modified but unwritten data to the disk at the server. In order to do so, the server revokes any outstanding file token, revokes the data bytes associated with the file on any client machines, and then performs the local f_sync operation at the server which forces the modified data bytes to the disk. The server will only perform the f_sync operation if the client has previously opened, and not yet closed, the file for writing. The op code 421, 423 indicates which operation is being performed. The op code value is dependent upon the message for each individual operation. The file handle 422 is a value that uniquely identifies a file residing at the server machine. The return code 424 is a value which indicates the success or failure of the requested operation.

Figure 4B:
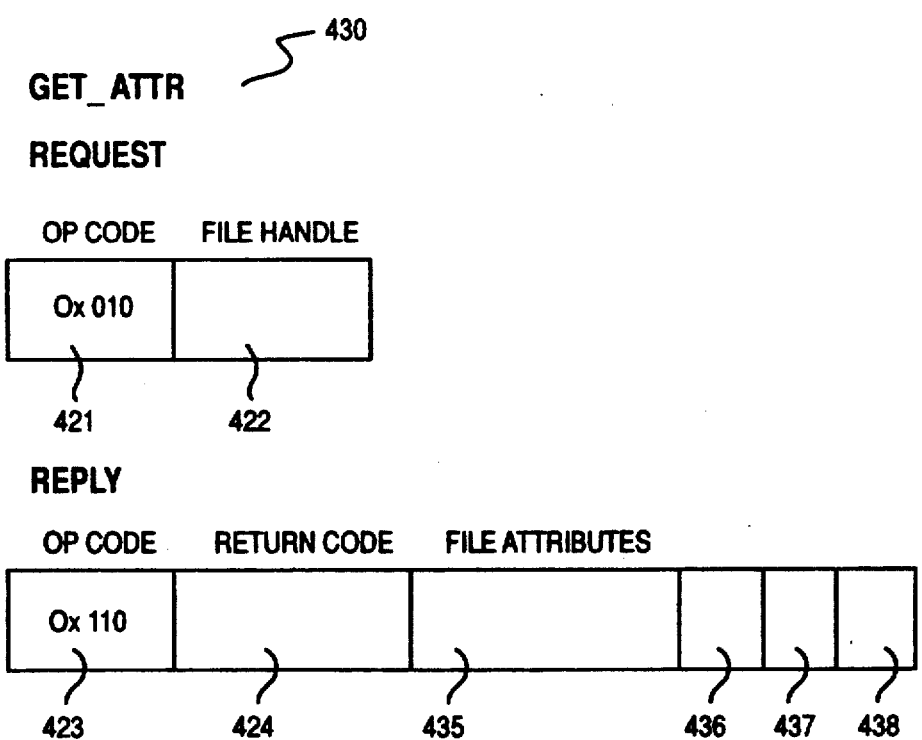
FIG. 4B is the data structure of a get_attr message for requesting the attributes of a file.

FIG. 4B shows the get_attr message 430 which gets the attributes of a file. The file attributes 435 contain the information about the file including access time 436, modify time 437 and file size 438.

Figure 4C:
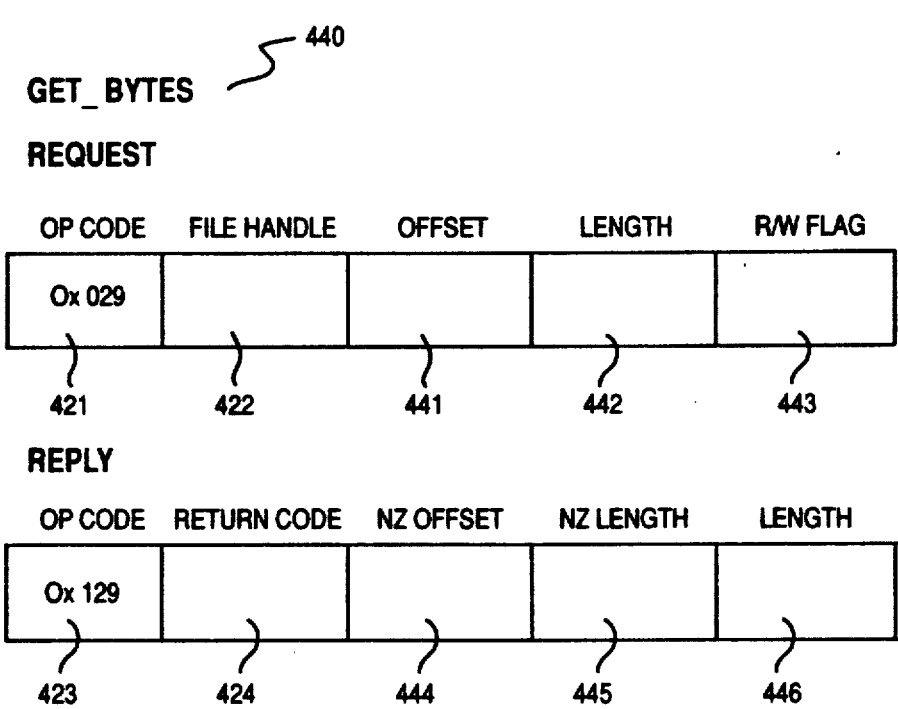
FIG. 4C is a data structure of a get_bytes message for requesting data bytes from a file.

FIG. 4C shows the get_bytes message 440 which requests data bytes from a file. The offset 441 is the offset in the file that marks the beginning of the data that is requested. The length 442 is the number of requested bytes. The read/write flag 443 is used to indicate that the client is requesting a read only copy of the data or a writable copy of the data. The allowed values of rw-flag are 0×0000 if the client will only read from the byte range, and 0×0001 if the client may modify the bytes. The server will only perform the get_bytes operation if the client node has previously opened, and not yet closed the file in a compatible mode. If the rw_flag 443 is read only, then the client must have the file open. If the rw_flag 443 is read write, then the client must have the file open for writing.

In the reply of the get_bytes message 440, the nz_offset 444 is the offset within the file for which the bytes have been requested for which there are nascent zeros. Nascent zeros are described in copending application Ser. No. (IBM internal docket number AT9-89-029) "File Extension By Clients In A Distributed Data Processing System" filed May 12, 1989, in the name of Smith, Todd A., which is hereby incorporated by reference. This field is meaningful only when the field nz_length is greater than zero. The field nz_length 445 is the number of bytes of nascent zeros beginning at offset nz_offset 444 which the server chooses to return to the requestor. The server may always choose not to do any nascent zero processing and indicates this by returning zero in this field. Length 446 is the length of the returned data. Data 447 is the actual data bytes requested.

Figure 4D:
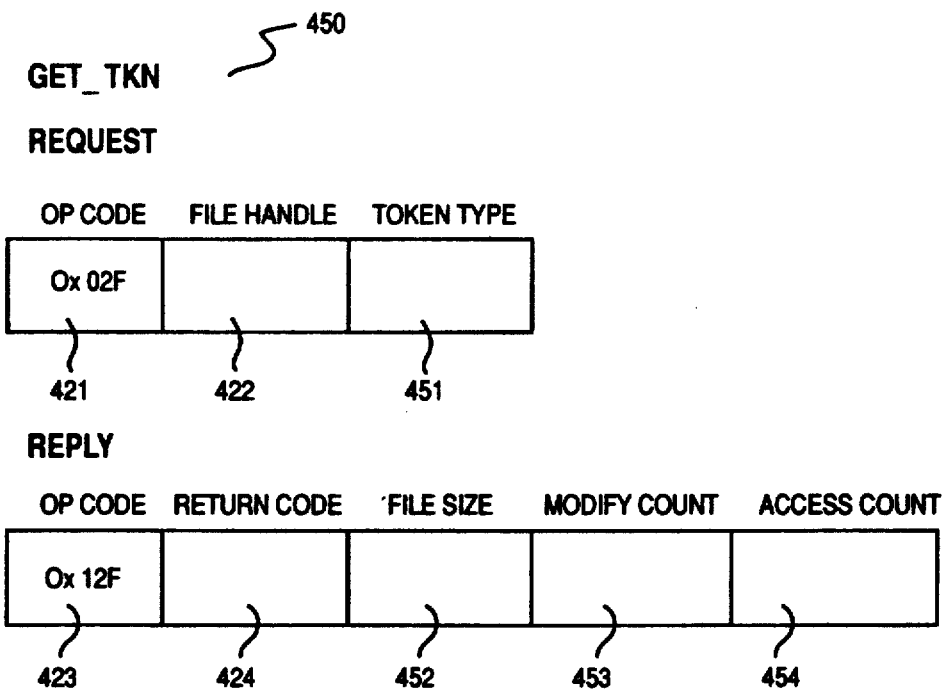
FIG. 4D is a data structure of a get_tkn message for requesting permission to read or read and write to the file.

FIG. 4D shows the get tkn message 450 used by a client to request a token from the server. Token_type 451 specifies which kind of token is requested. Allowed values are 0×001 if a read only token is being requested; and 0×0002 if a read/write token is being requested. The server will only perform the get_operation if the client node has previously opened, and not yet closed, the file in a compatible mode. The file size 452 is the size of the file. Modify count 453 is a value maintained by the server reflecting modifications of a file. The access count 454 is a value maintained by the server reflecting accesses to the file.

Figure 4E:
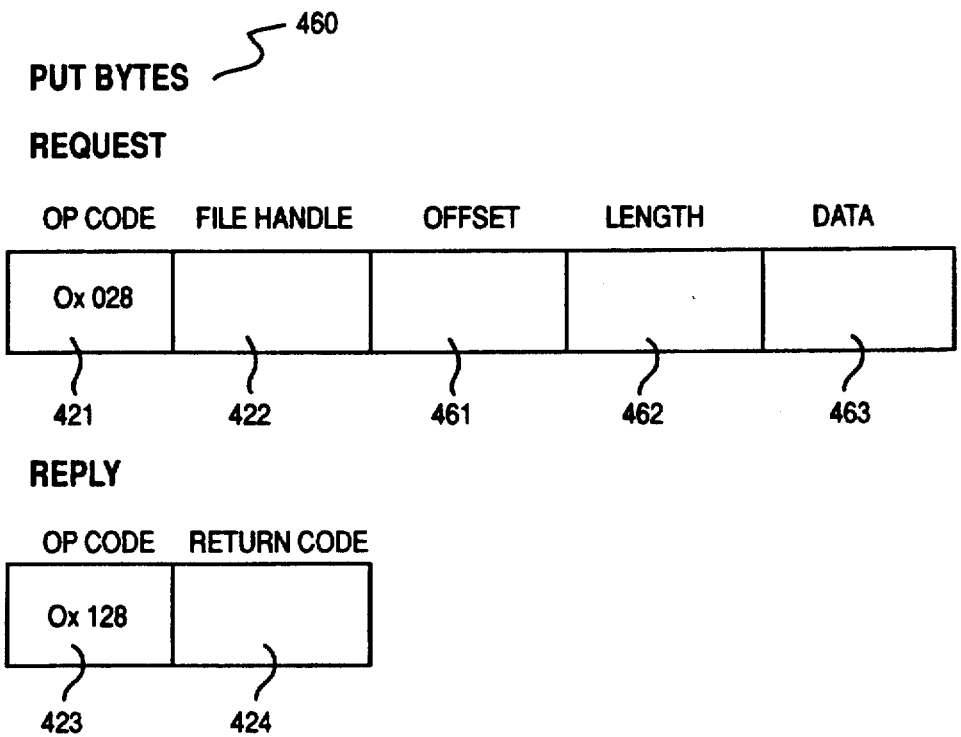
FIG. 4E is a data structure of the put_bytes message for sending modified bytes back to the server data processing system from the client data processing system.

FIG. 4E shows the put_bytes message 460. The client returns modified data to the server with the put_bytes message 460. The server will only perform the put_bytes operation if the client has previously opened, and not yet closed, the file for writing. Offset 461 is the offset within the file where the data bytes 463 of length 462 should be placed.

Figure 4F:
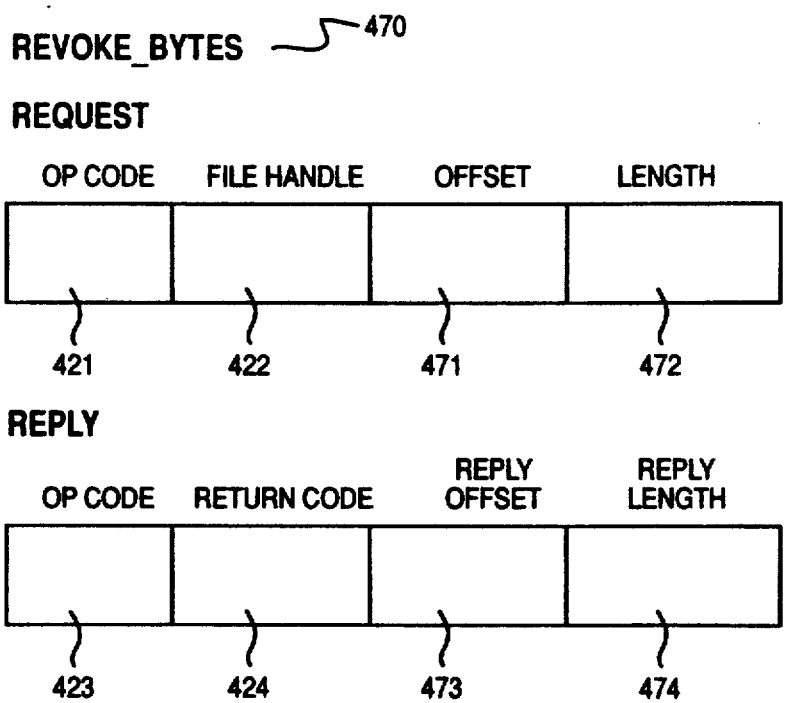
FIG. 4F is a data structure of the revoke_bytes message for revoking the bytes previously sent in the reply to a get_bytes message.

FIG. 4F shows the revoke_bytes message 470. This message is sent from a file's server to a client to revoke the bytes previously given to the client in the reply to a get_bytes message 440. The client does not send the reply until, for the byte range indicated by offset 471 and length 472, it has discarded all clean cached data and nascent zeros and has written all dirty data to the server and received replies. When the client sends the reply, it must have no cached data for the revoked byte range. This message revokes the client's right to use any previously returned nascent zeros which fall within the revoke range. Any data or nascent zeros within the revoked byte range returned by get_bytes requests which were outstanding when a revoke_bytes is processed must be discarded when they arrive. The client may chose to revoke a larger byte range than requested, or it may be able to determine that it has nothing to revoke in a larger range than the requested range. In such cases, reply_offset 473 and reply_length 474 indicate a range for which the client has no cached pages. Reply_offset 473 and reply_length 474 must at least include the range indicated by offset 471 and length 472.

Figure 4G:
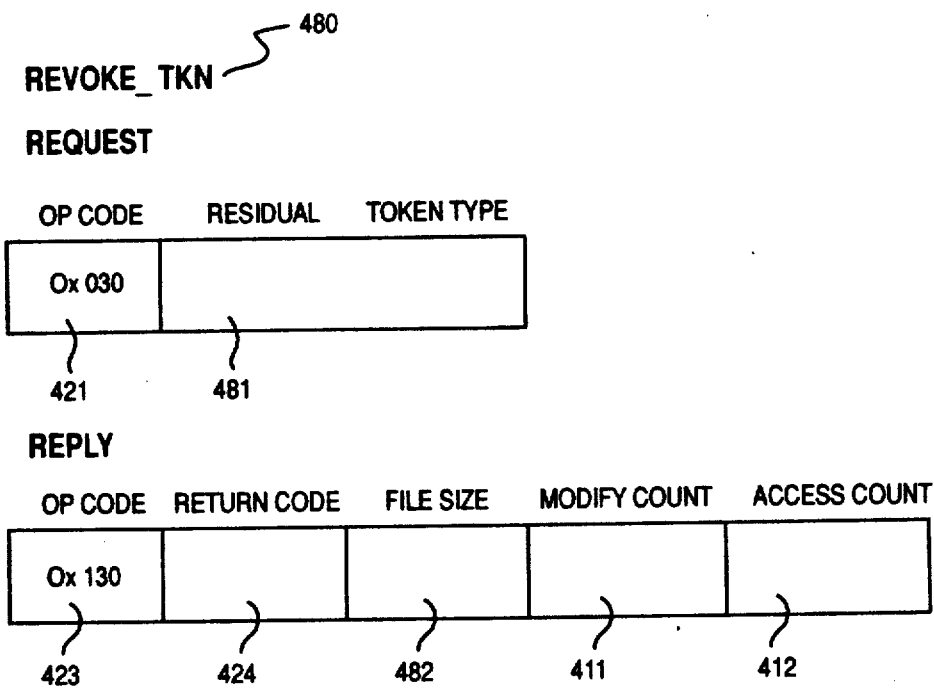
FIG. 4G is a data structure for the revoke_tkn message for revoking the token granting a permission to read the file or for revoking the token granting a permission to read and write to the file.

FIG. 4G shows the revoke tkn_message 480. This message is sent from a server to a client to revoke the token that the client received in reply to the get_token 450 message. The residual_token_type 481 specifies which kind of token the client is to be left with. Allowed values are: read_tkn 0×0001 the client retains a read only token write_tkn 0×0002 the client retains a read/write token no_tkn 0×0000 the client does not retain any token The file size 482 is the size of the file as viewed by the client after any data modification.

In order to avoid confusion between the server and client about the state of the system, the following rule must be followed. Processing of revoke_tkn 480 for a file at a client is delayed until the reply to any outstanding get tkn 450 for that file has been processed.

Figure 4H:
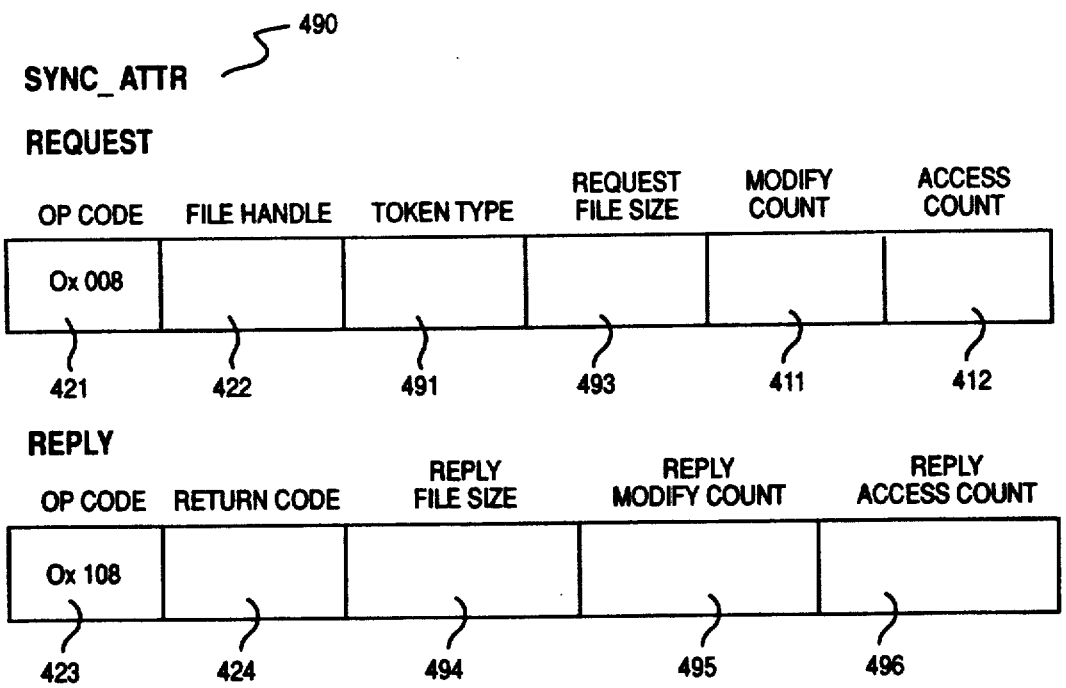
FIG. 4H is a data structure for the sync_attr message for periodically sending the attributes of the file back to the server from the client during a sync operation on the attributes of the file.

FIG. 4H shows the sync_attr message 490. This message performs the sync operation on the attributes of a file. Token_type 491 specifies which kind of token the client holds. Valid values are the following:

read_tkn 0×0001 the client retains a read only token
write_tkn 0×0002 the client retains a read/write token The request file size 493 is the file size at the client. The reply file size 494 is the file size at the server. Reply modify count 495 reflects the modifications recorded at the server. The reply access count 496 reflects the accesses recorded at the server. In order to avoid confusion between the server and client about the state of the system, the following rule must be followed. Get_tkn operations and sync_attr operations are serialized at the client. A get$_{13}$tkn request for a particular file cannot be issued while there is a sync_attr for that file outstanding.

Figure 4I:
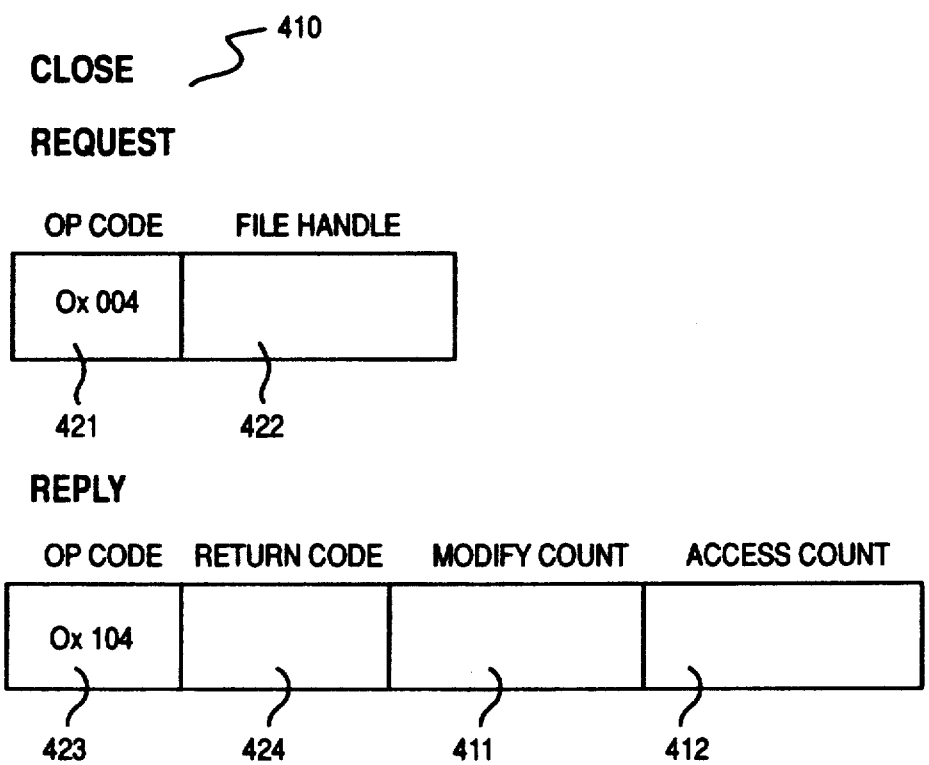
FIG. 4I is a data structure of the close message for informing the server of a close operation on the file.

FIG. 4I shows the close message 410 used by clients to inform the server of close operations. The modify count 411 is a value that reflects modifications at the client. The access count 412 is a value that reflects accesses at the client.

Figure 1:
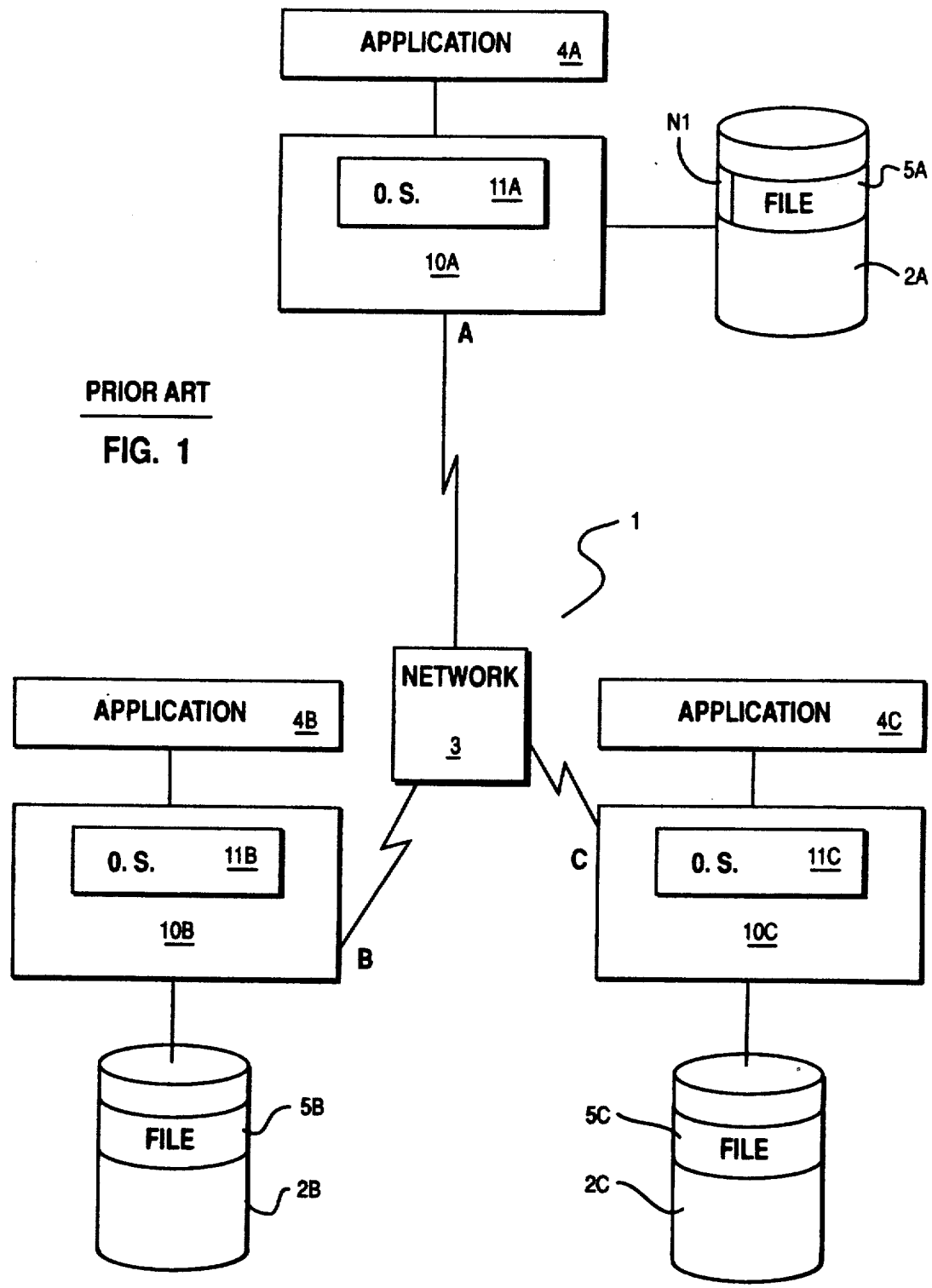
FIG. 1 is a block diagram of a distributed data processing system known in the art.
Figure 2A:
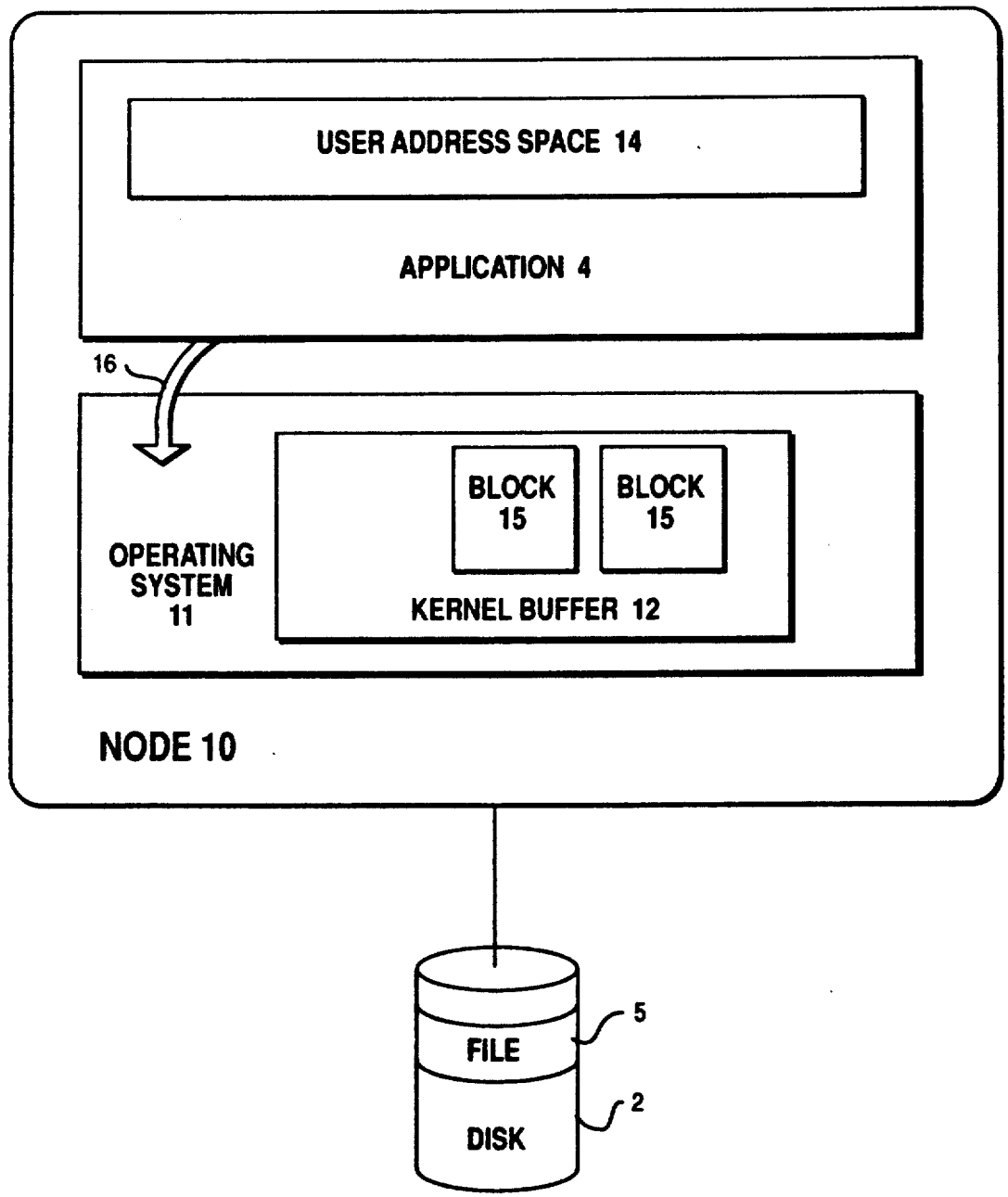
FIG. 2A is a block diagram showing a stand-alone data processing system known in the art for accessing a file through system calls.
Figure 2B:
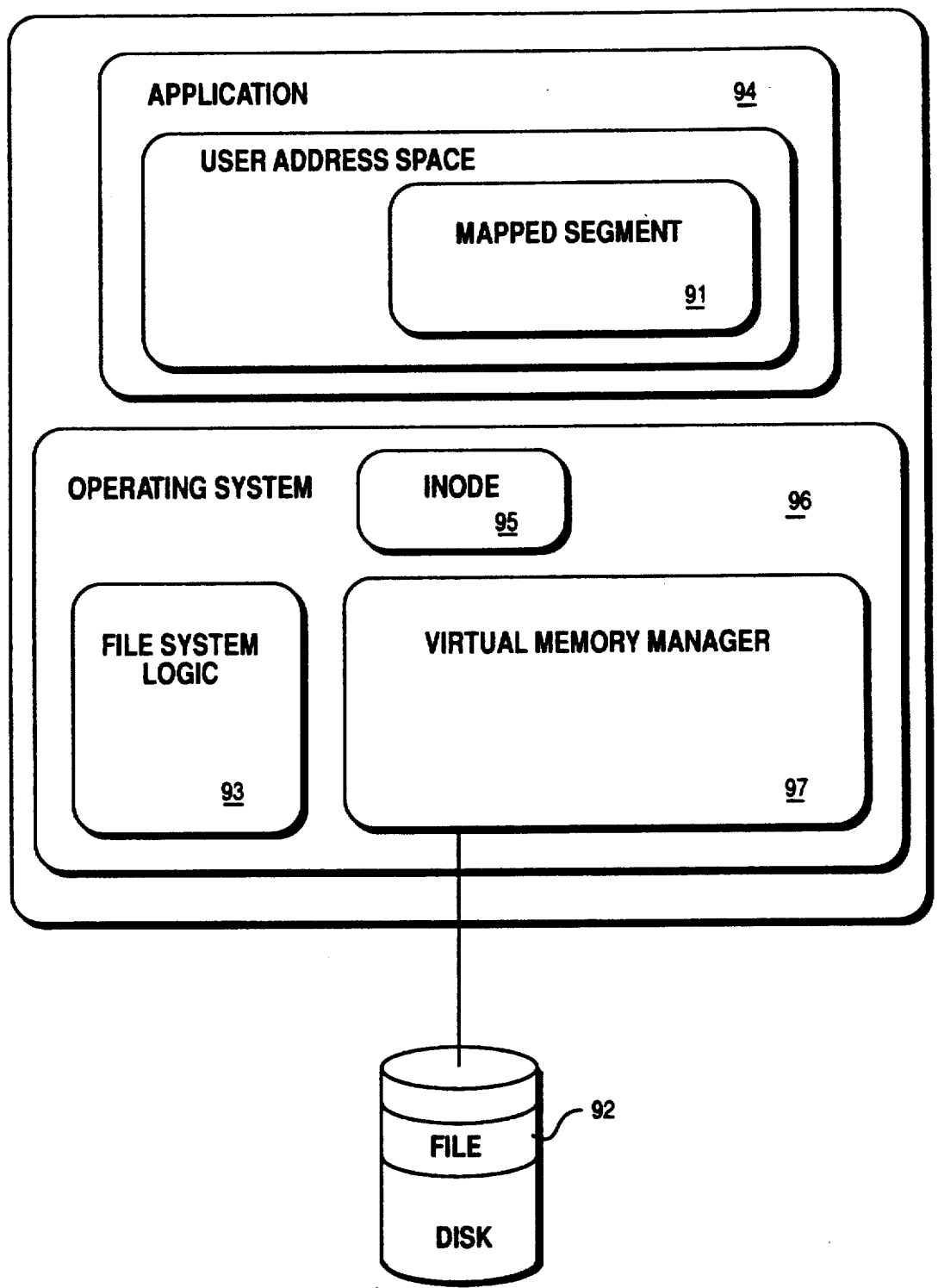
FIG. 2B is a block diagram showing a stand-alone data processing system known in the art showing mapped file access.
Figure 3:
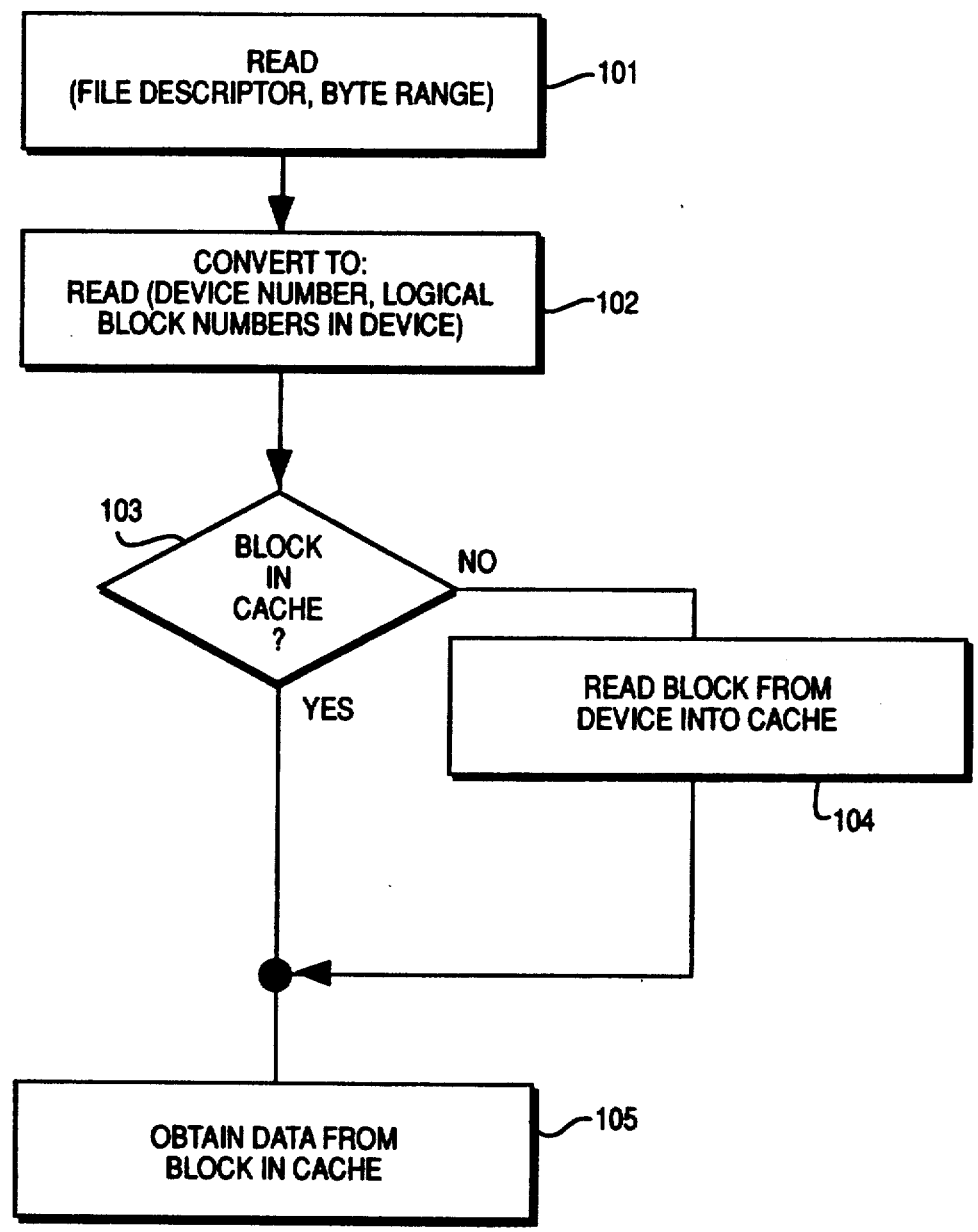
FIG. 3 is a flow diagram of the data processing system of FIG. 2A accessing a file through a system call.
Figure 5:
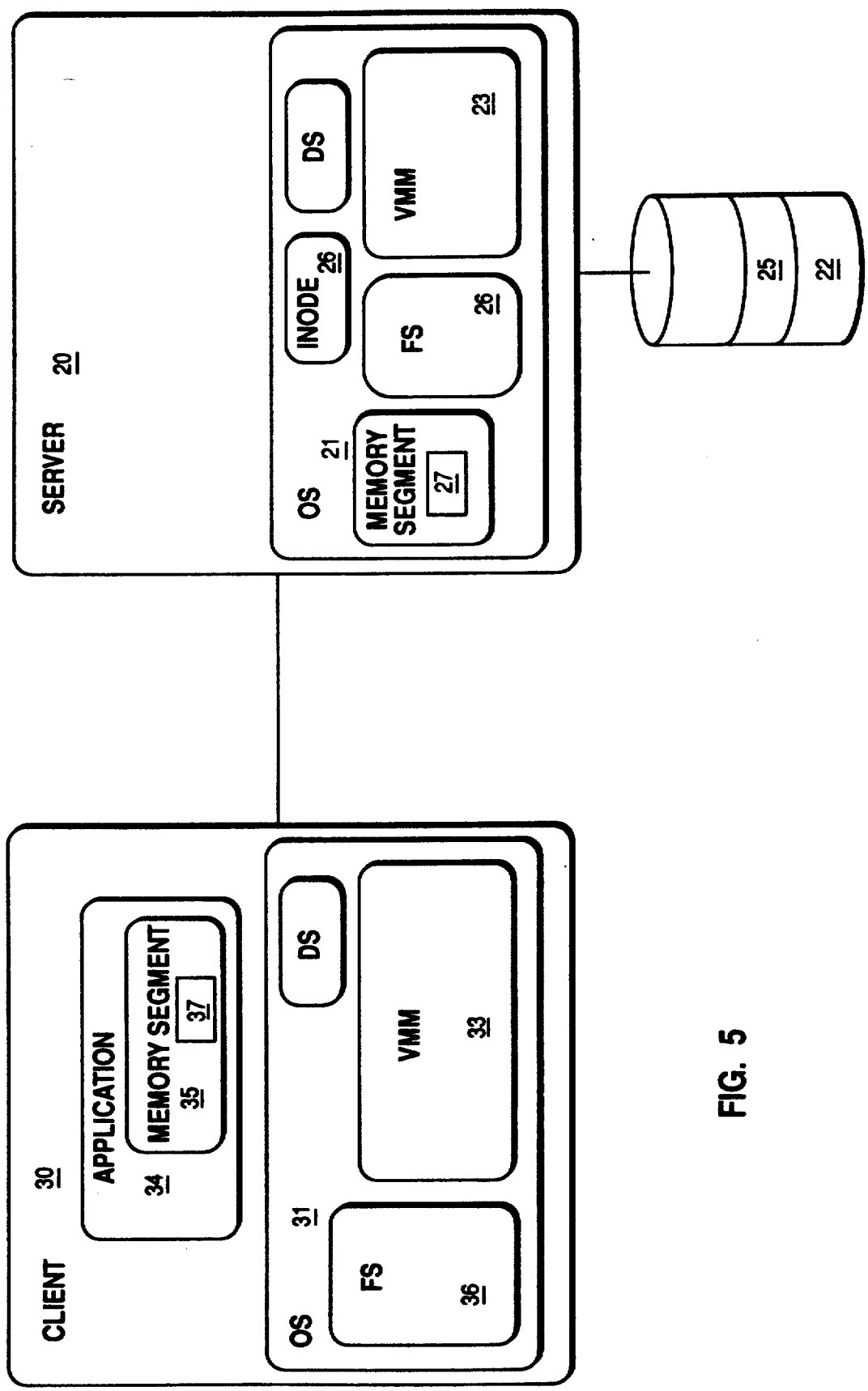
FIG. 5 shows a client data processing system and a server data processing system in the distributed data processing system of this invention.

In the preferred embodiment of this invention as shown in FIG. 5, a virtual memory manager 33 is used to manage cached file data instead of using the traditional kernel buffers 12 as shown in FIG. 2A. In addition, the preferred embodiment of this invention allows files to be mapped into virtual memory segments 35 of an application 34. However, this preferred embodiment avoids heavily intertwining the file system logic 36 with the virtual memory manager logic 33. During sync, fsync, the periodic sync of the file system (which are system calls of the AIX operating system, as described in the AIX Operating System Technical Reference, order number SV21-8009 and part number 74X9990, September 1986, which is herein incorporated by reference, but are applicable to system calls of other operating systems which cause all information in memory that should be on disk or permanent storage to be written out), and the last close of a file, the file size in the inode data structure 26 is set according to the following rule:

If the inode file size is contained in the rightmost page then the inode file size is left as is. Otherwise, the inode file size is set to the end of the rightmost page.

The inode access time and modify time attributes are similarly loosely coupled to the most recent virtual memory activity.

Figure 6A:
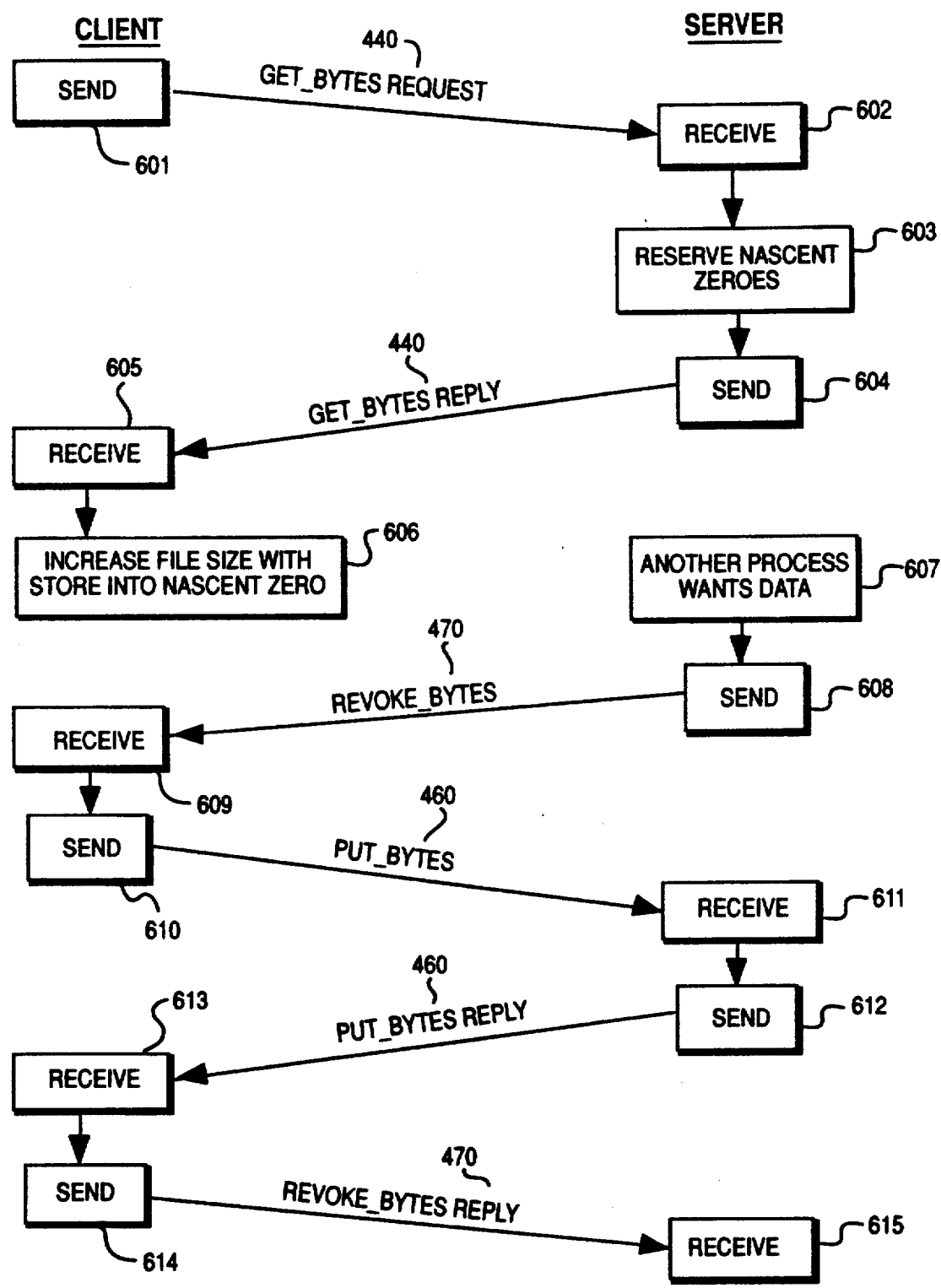
FIG. 6A is a flow diagram of the sequence of the internode messages when two clients request write permission to the same data.

With reference to FIGS. 5 and 6A, clients 30 can extend file 25 by storing past the end of file. When no page in the file at the location of the store exists at the client, the client is forced to obtain the data for the page by issuing a get_bytes request 440 to the server. The get_bytes request 440 returns a data block which is inserted into the page and the store goes into the page contents. Clients may also have reserved space past the end of file. Stores into this reserved space do not require a get_bytes request be issued to the server. When a client issues a get_bytes 440 at the end of a file, steps 601, 602 the server may return an indication 444, 445 (FIG. 4C), step 603, that the client can reserve space past the end of file, steps 604, 605. This reserved space is referred to as nascent zeros as disclosed in copending application serial number (IBM internal docket number AT9-89-029), which is herein incorporated by reference. When the client stores into these nascent zeros, the file's size increases, step 606. The server 20 does not become aware of the file's growth until the client issues put_bytes 460 (FIG. 4E) to write the data back to the server, steps 610, 611. It should be noted that the client may unilaterally decide to write the data back, or it may be instructed to do so by a revoke_bytes message 470 (FIG. 4F) that the client 30 receives from the server 20, steps 608, 609 because another process requested the same data, step 607. This other process is allowed to use this data after the reply to the revoke bytes request 470, arrives at the server, steps 614, 615. The client 30 sends the revoke_bytes reply 470 in step 614 only after receiving the put_bytes reply 460 in steps 612, 613.

Figure 6B:
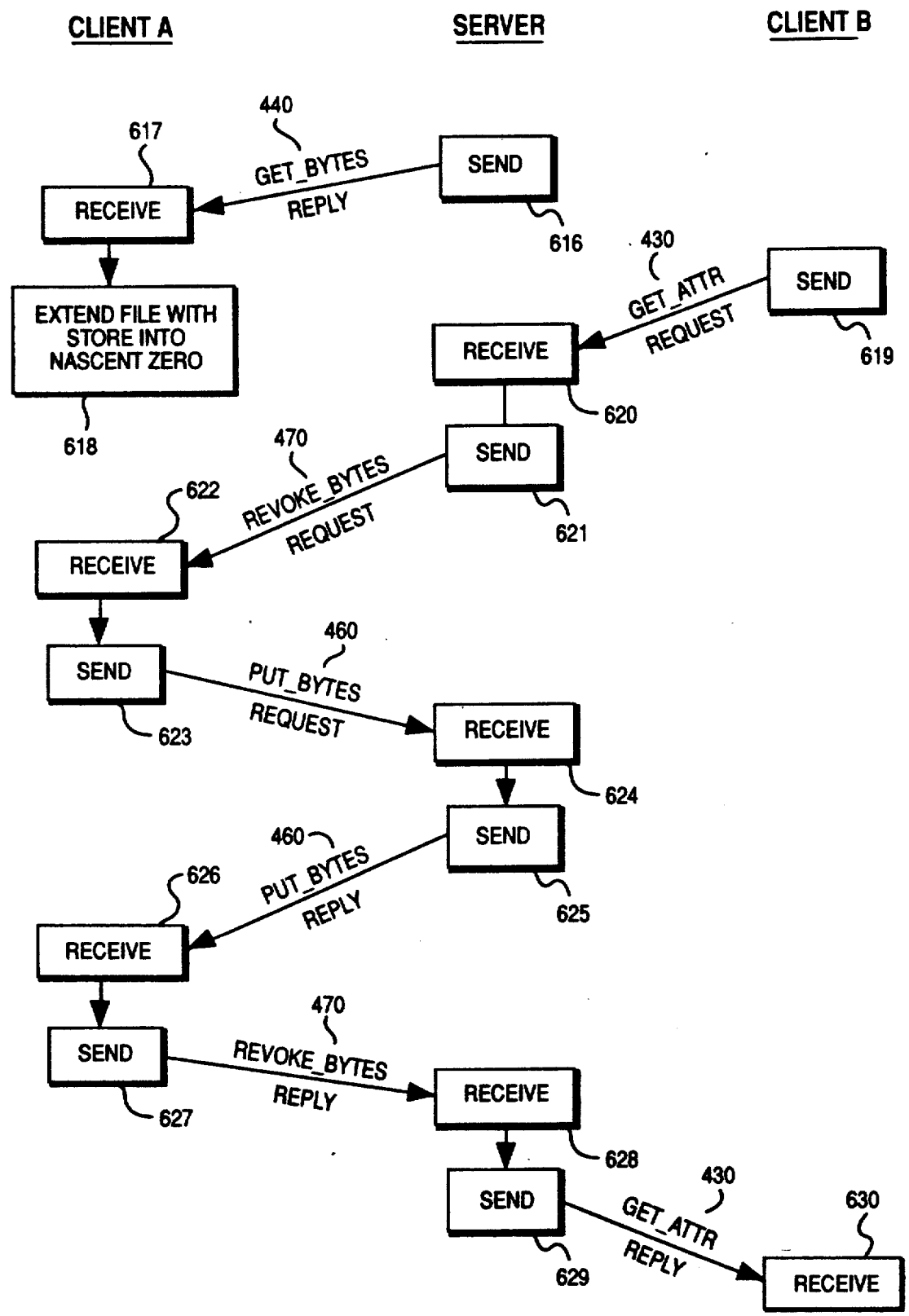
FIG. 6B is a flow diagram when one client requests the attributes of a file in which another client is modifying.

Referring to FIG. 6B, when a client performs a stat operation to query the attributes of a file, the stat operation causes a get_attr request 430 to be sent to the file's server. One of the elements in the structure returned by get_attr is the file's size 436 (FIG. 4B). Consider the following scenario:

1. Client A has received on a get_bytes reply 440, and stored into, some nascent zeros at the end of a file, steps 616, 617, 618. The client has not sent the new file data back to the server.

2. Client B issues a get_attr 430 for the file, steps 619, 620.

If rigorous correctness were required, then the server would have to issue revoke_bytes 470 to client A, steps 621, 622 to determine if any end of file nascent zeros have been stored into, before replying to client A's get_attr 430, steps 629, 630. Requiring the file size 436 (FIG. 4B) returned in get_attr 430 to accurately reflect the most recent client stores as described above incurs a twofold performance penalty:

1. Get_attr cannot be replied to in steps 629, 630 until a revoke_bytes 470 has been issued, steps 621, 622 and replied to, steps 627, 628.

2. In responding to a revoke_bytes, a client might have to issue one or more put_bytes 460 back to the server, steps 623, 624 and await their reply, steps 625, 626.

In order to avoid this performance penalty, and in recognition of the fact that the size of a file which is open for writing is likely to be changing anyway, the protocol does not require that the file size 436 returned by get_attr 430 reflect the most recent client stores. A server could be implemented which does issue revoke_bytes 470 before responding to get_attr 430, but clients cannot depend upon servers doing so.

In view of the relaxed rules for clients, and in order to allow server implementation options, the protocol does not require that the file size 436 returned by get_attr 430 reflect the most recent stores by server processes. And, since a server is likely to treat bytes sent in by put_bytes 460 and bytes written by local processes similarly, the protocol does not require that the file size 436 returned by get_attr 430 reflect the most recently received put_bytes.

The protocol does require the following:

1. Clients are expected to periodically send in, via put_bytes 460, any modified or created (i.e. nascent zeros that have been stored into) file data. Clients are also expected to send in modified or created data before sending the last close message 410 for a file.

2. Servers are expected to periodically update the file size in the inode data structure 26 (FIG. 5) to reflect recent activity by server processes and to reflect recently received put_bytes messages 460.

3. As part of processing a fsync request, servers are expected to revoke data from all clients and to update the file size 436 returned by get_attr 430 to reflect the returned data, and also to reflect any previous activity by server processes.

Thus, part of a client's periodic sync operation is to write dirty data to the server, and part of a server's periodic sync operation is to write local modifications and received client modifications to disk. Unless some other event occurs, such as a fsync or the last close of a file, a client's modification will not show up in the file size 436 returned by get_attr 430 until the client's periodic sync has been followed by a server periodic sync.

A client is likely to organize its file data cache in fixed size blocks. Consider the following scenario:

1. A client stores into an end of file nascent zero, this increasing the file's size.

2. A periodic sync operation at the client causes a put_bytes message to be sent to the server.

In a typical client implementation, the byte range specified in the put_bytes message 460 by an offset 461 and length 462 will be aligned with a client page. The byte range will contain the last byte in the file, but will, in most cases, extend past this last byte. Furthermore, the server's page size may not match the client's. Therefore, when the put_bytes data arrives at the server it may be placed into a server page which extends past the last data byte sent in the message. Due to this page size quantization, the server cannot reasonably know exactly which byte is the end of file. It only knows the page which contains the last byte. For these reasons, the protocol only requires that the server periodically update the file size in the inode data structure 26 so that it includes the server's right-most page. The last byte in the file may have been previously sent in via put_bytes 460, or it may have been created by a server process.

As described above, clients can alter a file's size by sending put_bytes messages to the file's server. A client can exercise more precise control when altering a file's size by acquiring the file's write token.

Figure 6C:
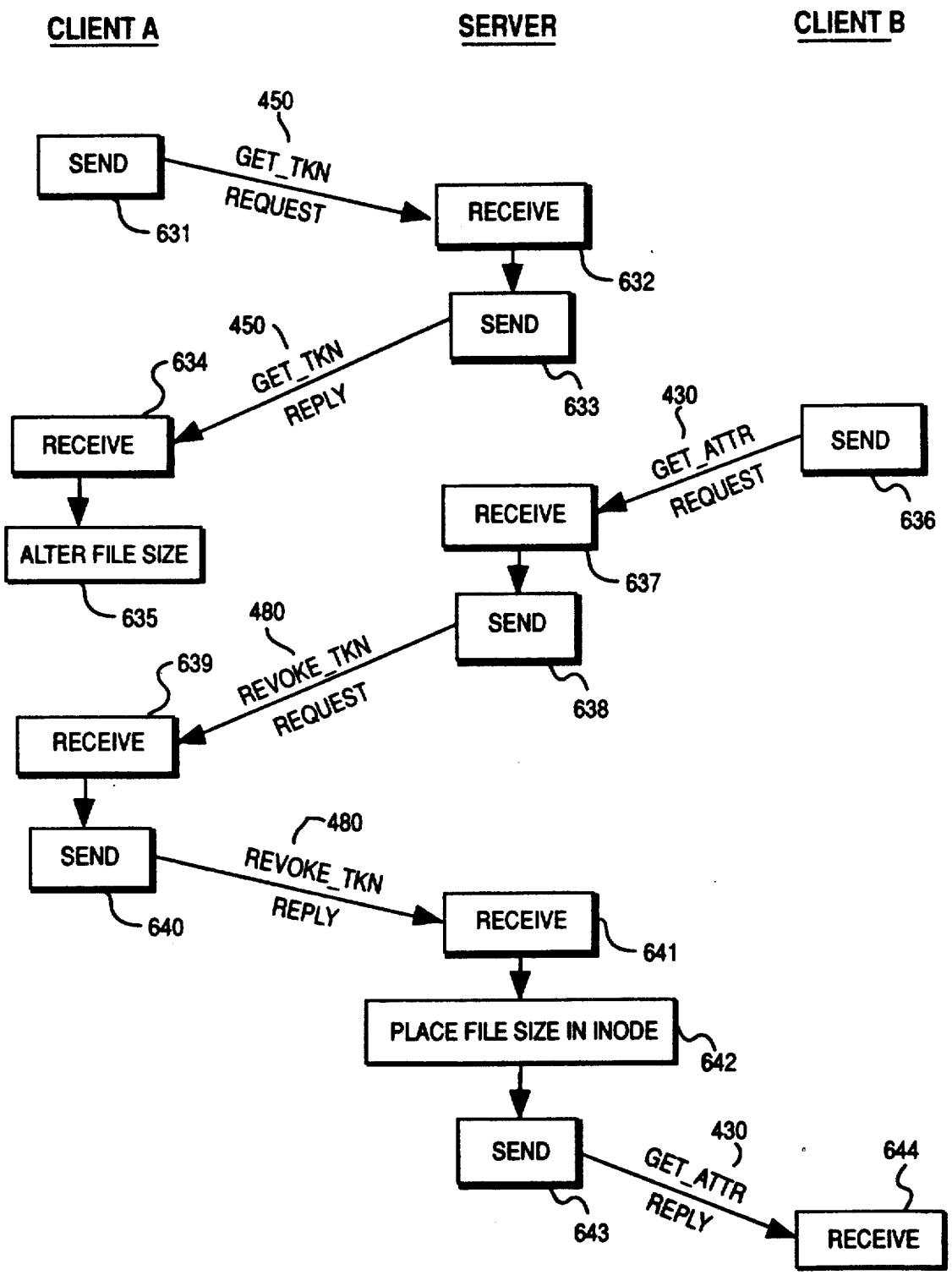
FIG. 6C is a flow diagram showing the server maintaining the latest file attributes when one client requests read or read/write permission to the file and another client requests the attributes of the file.

Referring to FIG. 6C, when a client A sends a get_tkn 450 requesting the write token, steps 631, 632, the reply, steps 633, 634, carries the file's size 452 (FIG. 4D). This is the same size value 436 that would be returned in a get_attr request 430. While the client holds a file's write token, it may alter the size of the file, step 635. The altered size is returned to the server in the reply to a revoke_tkn message 480 or in a sync_attr message 490. The rules which govern the file size are described as follows.

When a server receives a get_attr request 430, steps 636, 637 it sends a revoke_tkn message 480, steps 638, 639 to the client which holds the file's write token, if such a client exists. This revoke_tkn message 480 instructs the client to return the file's current size in the reply, steps 640, 641, but it does not cause the client to lose ownership of the token (i.e., it is flagged as a non purging revoke). The returned file size is placed in the inode 26 (FIG. 5), step 642, and returned in the get_attr reply, steps 643, 644.

Figure 6D:
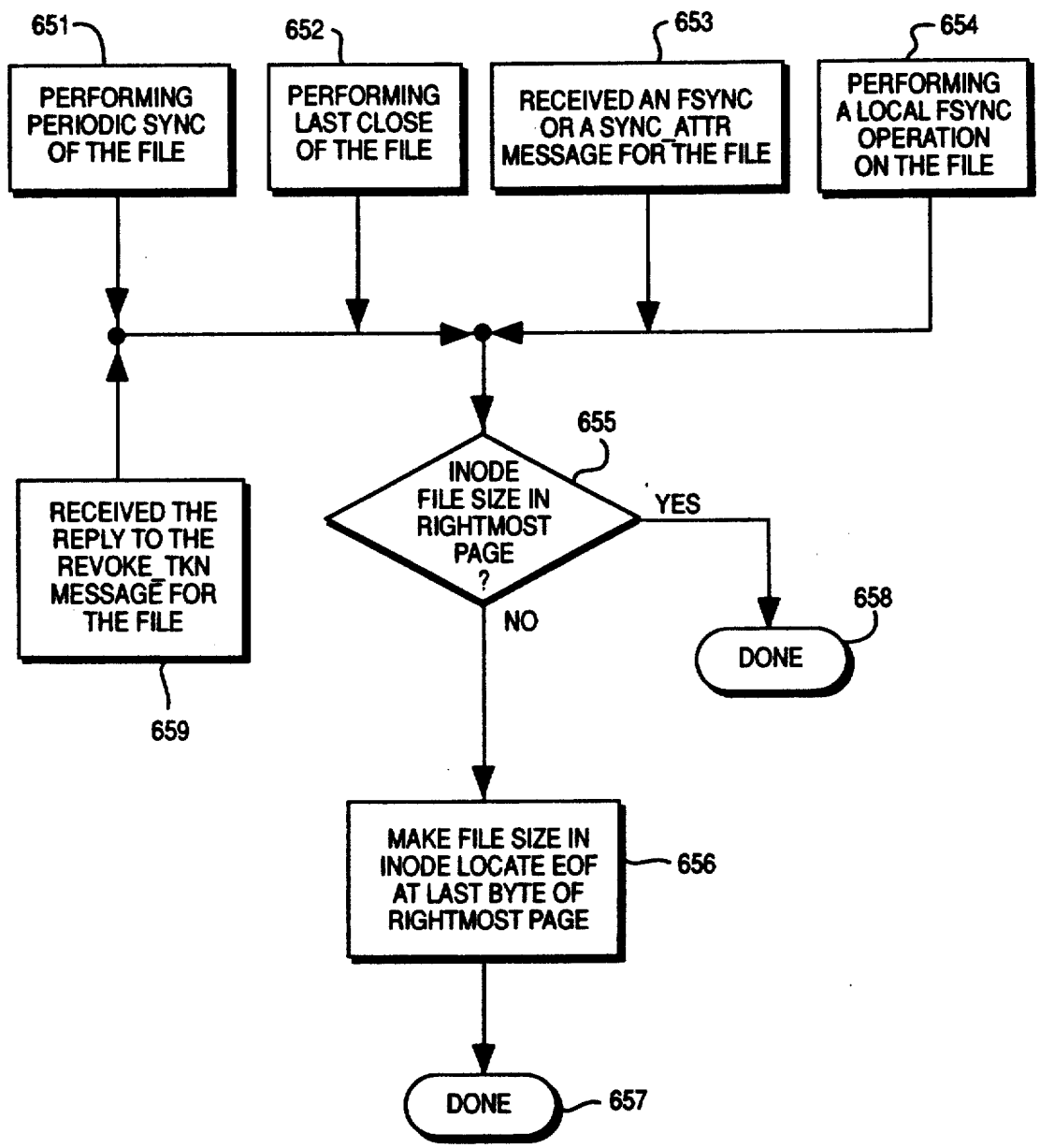
FIG. 6D is a flow diagram showing the operations at the server that will cause the file size stored at the server to be made consistent with the virtual memory manager's rightmost page whereby the latest file attributes are maintained at the server when clients are writing to the file through either system calls or mapped access.

With reference to FIG. 6D, several operations at the server will cause the file size stored in a file's inode to be made consistent with the location of the file's rightmost page maintained by the virtual memory manager, step 656. The file size is consistent if the resulting end of file falls within the rightmost page. Among these synchronizing events are:

1) The server performs a periodic sync of the file, step 651.

2) The server performs the last close of a file, step 652.

3) The server receives any of several messages, such as fsync, which cause it to synchronize the client and sever knowledge of the file, step 653.

4) A server process performs any of several operations, such as fsync which cause it to synchronize the client and server knowledge of the file, step 654.

If one of the above synchronizing events occurs, and if the inode file size is contained within the server's rightmost page of the file or is to the right of the rightmost page of the file, step 655, then the inode value is left as is, step 658. Otherwise, the inode size is adjusted to place the end of file at the last byte in the rightmost page, step 656.

The client could have modified cached pages which it has not yet sent to the server. Thus, the file size returned in the revoke_tkn message 480 (FIG. 4E) could be to the right of the server's rightmost page.

A server updates the inode's file size when it receives a sync_attr message (issued by a client's periodic sync), step 653, or when it receives the reply to a revoke₁₃tkn, step 659.

A client, with the write token and using write to modify a file, may send in, because of cache overflow, the rightmost page of the file. If the server receives this and then performs a periodic sync, step 651, it will move the file size to the end of this page, step 656, when this page is a page beyond the server's current record of the file size, as determined in step 655. When the client subsequently sends in the file size due to a revoke token request, step 659, a sync_attr or fsync request, step 653, the inode's file size may be found to be within the rightmost page known to the server, step 655, and hence left there, step 658. Note that this operation may cause the file size to be reduced from its end of rightmost page value.

In the preferred embodiment, a client process which is operating on a file with traditional write system calls is expected to acquire the write token and update the file size as the write's are processed. If it does so, then the file size returned by get_attr will always be up to date. A client may operate via mapped access by issuing only get_bytes and put_bytes without acquiring the file's write token. In this case, the file size returned by get_attr will be at the end of the server virtual memory page which contains the rightmost byte, and only client data which has been written to the server before the most recent server periodic sync shows up in the size.

Even though a client holding the write token is the only node allowed to change the size of the file by system calls, mapped access to the file allows other clients or the server to change the size of the file through direct memory references. In order to keep all clients using the file reasonably up to date as to the file size, all clients using the file periodically send attribute information about the file to the server with the sync_attr message 490. The server's currently computed size of the file is returned in the reply to the sync_attr message 490. Thus, a change in the size of the file at one client is propagated to the server when this client performs its sync_attr message, and is propagated to the other clients using the file when each of them performs a subsequent sync_attr message 490 for the file.

The management of a file's modify time, as returned by a system call to query the file's attributes, e.g. a stat system call, is roughly analogous to the management of the file's size. If a client operates exclusively through put_bytes, without obtaining the file's write token, then its file modifications will eventually, but not immediately, be reflected in the modify time returned by system calls executed at the server or other clients.

However, a client which acquires, and properly manages, the file write token can be assured that the modify time returned by systems calls at the server or other clients will properly reflect modifications to the file by this client.

Figure 7A:
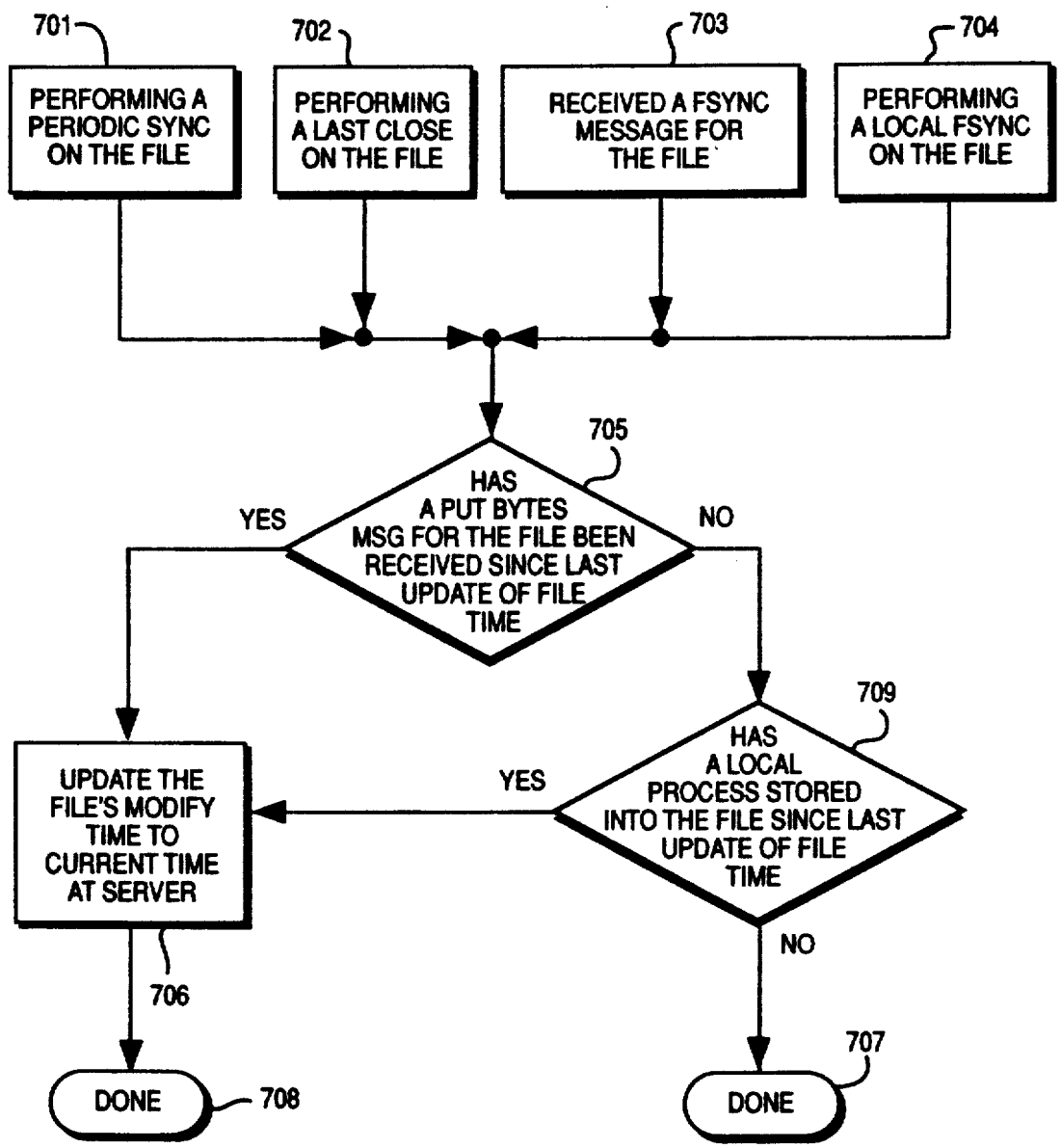
FIG. 7A is a flow diagram showing the events that cause the server to update the file modification time.

Referring to FIG. 7A, several events cause the server to check to see if file modifications need to be reflected in the file modification time. Among these synchronizing events are the following:

1) The server performs a periodic sync of the file, step 701.

2) The server performs the last close of a file, step 702.

3) The server receives any of several messages, such as _fsync, which causes it to synchronize the client and server knowledge of the file, step 703.

4) A server process performs any of several operations, such as _fsync, which cause it to synchronize the client and server knowledge of the file, step 704.

When one of the synchronizing events occurs, then the server checks to see if it has received a put_bytes, or has had the file stored into by any local process since the previous synchronizing event, steps 705, 709. If so, then the file's modify time is updated to the server's current time, step 706.

If a client chooses to modify a file via put_bytes without also holding the file's write token, then the following scenario can occur:

1) Client A opens a file and fetches some data via get_bytes.
2) Processes at Client A store into the fetched data.
3) A process at Client B issues get_attr for the file.
4) Since Client A has not requested the write Token, no messages are sent from the server to Client A.
5) The server is unaware that Client A has modified the file and thus returns the pre-open modify time in get_attr.

Figure 7B:
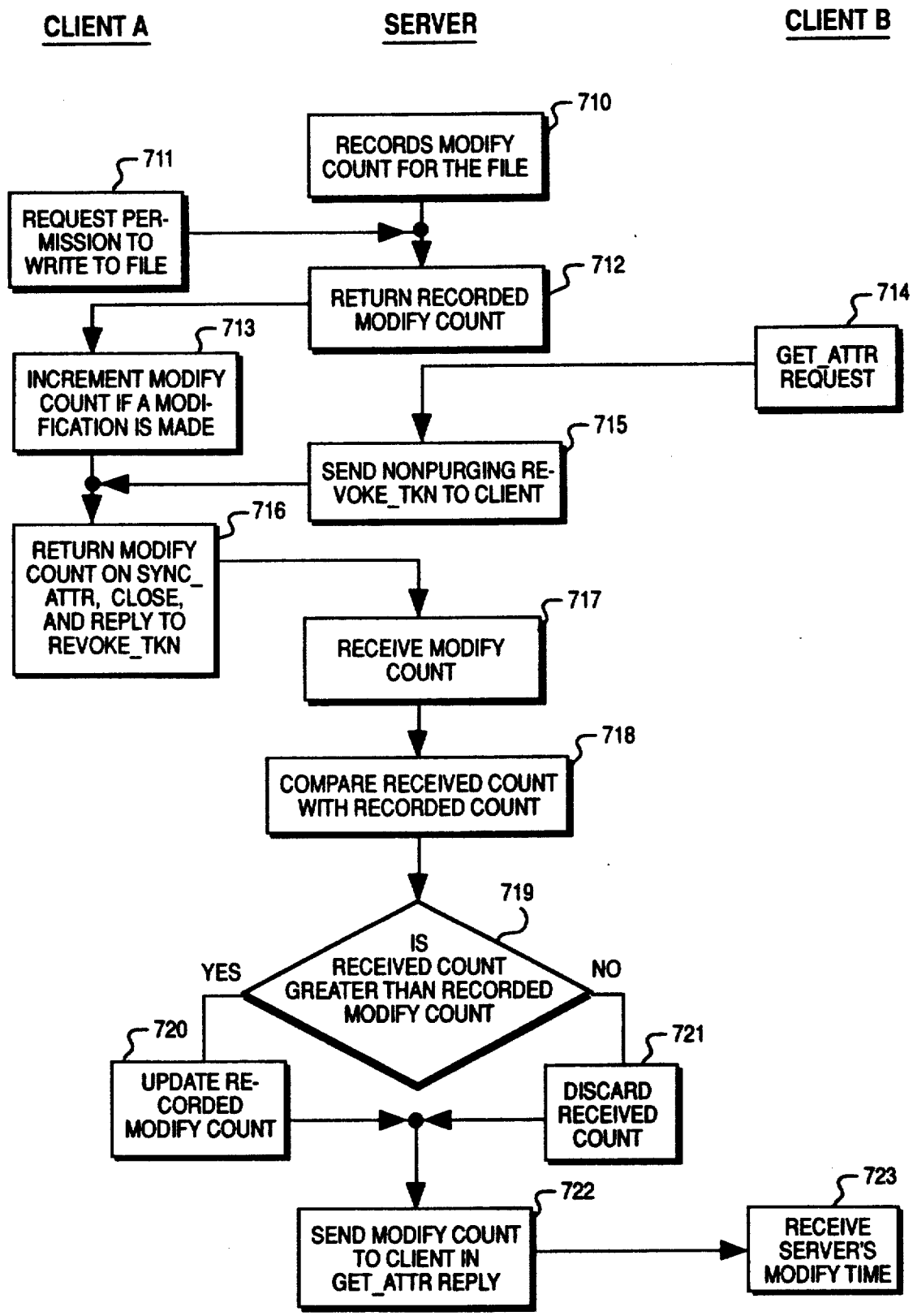
FIG. 7B is a flow diagram showing the server maintaining the latest file modification time when a client is writing to the file.

To avoid the above possibility, clients can use the file's write token to cause all of their modifications to be reflected in the modify time returned by get_attr as shown in FIG. 7B. The write token is used to manage the modify time according to the following rules:

1) The server remembers a modify count for the file, step 710.
2) When a client requests a write token via get_tkn, step 711, the modify count is returned in the reply, step 712.
3) When a client wants to be sure that a file modification is reflected in the modify time of any subsequent get_attr, then the client increments the modify count when it makes the modification, step 713. For instance, a write(2) system call would increment the modify count.
4) The modify count is returned to the server on a sync_attr, on a _close, and on the reply to a revoke_tkn, step 716. As previously described, when the server processes a get_attr, it sends a nonpurging revoke_tkn to the client which holds the write token, step 715.
5) When the server receives a modify count from a node which holds the file's write token, regardless of how it arrived, it compares it to its remembered count, step 718. If the received count is greater than the remembered count, step 719, then the received count becomes the remembered count and the modify time is set to the server's current time, step 720, else the received count is discarded, step 721.

The previous scenario then becomes:

1) Client A opens a file, issues get_tkn to get the write token, step 711, and fetches some data via get_bytes.
2) A process at Client A issues a write(2) system call. This causes the write token modify count to be incremented, step 713.
3) A process at Client B issues get_attr on the file, step 714.

4) The server issues a non-purging revoke_tkn to Client A, step 715. The returned modify count is greater than the server's remembered count so the remembered count is updated and the server's current time is returned as the modify time in get_attr, step 722, 723.

In this scenario, the client A's use of the write token caused its modification to be reported by get_attr.

With a few exceptions, handling of a file's access time is analogous to the handling of the modify time These exceptions are discussed below.

There may be only one write token and the server must, therefore, remember only one modify count. There may, however, be multiple client nodes each holding a read token. Therefore, the server must remember an access count for each read token.

When the server receives a get_attr, it issues a non-purging revoke_tkn to the holder of the write token. This allows it to learn of any client modifications of the file. Analogous operation for the access time would require that the server issue a non-purging revoke_tkn to holders of read tokens. However, there are differences between the two cases. First, there could be many client nodes holding read tokens. Sending revoke_tkn messages to each of these clients could be expensive. Second, whether or not a file has been modified is a more significant piece of information than whether or not the file has been accessed.

For these reasons, and in view of the fact that get_attr is a relatively frequent request, the protocol does not require that holders of read tokens be polled as part of server's response to a get_attr. Client and server periodic sync operations cause accesses via system calls to eventually (depending on client and server periodic sync frequency) show up in access time attribute. Access via get bytes, without the benefit of the file's read token, are not reflected in the access time attribute.

As described above, the file attributes are kept in the read and write tokens. The file size and modify time attributes are kept in the write token, and the access time attribute is kept in the read tokens. Keeping the file attributes in the read and write tokens are useful to those processes that are performing read and write operations. Since processes do not have to acquire the write token to extend the file through mapped access, thereby changing the file size attribute and the modify time attribute, the file size attributes are not only stored in the tokens but also in the rightmost page of the file. The rightmost page of a file can be different than the size of the file. The rightmost page of the file is known by the virtual memory manager. Although the virtual memory manager does not know the exact size of the file, it does know the rightmost page of the file. Therefore, a process can extend a file by the virtual memory manager which extends the rightmost page of the file, or a process can write to the file and extend the file through the write token.

The server combines this information from the rightmost page and the information contained within a write token at a client to arrive at the current size of the file in response to requests from other clients requesting these file attributes.

A process extending a file through mapped access returns to the server the size of the file through the rightmost page when the file is closed by that process, or along with a periodic sync operation.

All clients must periodically send to the server any modified data with the put_bytes message. This allows a server to know when a client has extended a file. The server then updates the inode data structure for the file with this information.

If a client requests the server for the latest attributes, the server sends a request to the client with the token for the current information for the values of the attributes that are stored in the token. In response to a get attribute request from a client, the server sends a revoke token message to the client that holds the write token. This revoke token message is a special revoke token message which does not cause that client to loose the write token. Instead, the client sends a copy of the write token which has the file attributes back to the server while the client retains the write token. The server then uses this information from the write token and the rightmost page to reply to the get attributes request from a different client.

If any of the following events occur, the file size attribute at the server is adjusted. If the server performs a periodic sync of the file, a last close of a file, or a f_sync request, the server adjusts the size of the file attribute to be the rightmost page.

While the invention has been particularly shown and described with reference to a preferred embodiment, it will be understood by those skilled in the art that various changes in form and detail may be made without departing from the spirit and scope of the invention.

We claim:

1. A method of maintaining a first file size of a file residing at a server data processing system, said server data processing system connected to at least one client data processing system through a means of communication, said method comprising:
   maintaining a second file size in association with an ability to change said second file size at said at least one client data processing system;
   changing said second file size by said at least one client data processing system; and
   combining, by the server data processing system, said second file size from said client data processing system with said first file size at the server data processing system to determine a latest file size value.

2. A method of claim 1 further comprising obtaining information, by the server data processing system, about said second file size by receiving said second file size from at least one of said at least one client data processing system before making a determination of said latest file size.

3. A method of claim 2 further comprising receiving said second file size in response to a request sent from the server data processing system to at least one of the at least one client data processing system.

4. A method of claim 2 further comprising receiving said second file size from at least one of said at least one client data processing system when the client data processing system periodically writes the modified data at the client data processing system to the server data processing system.

5. A method of claim 2 further comprising receiving said second file size from at least one of said at least one client data processing system when the client data processing system performs a periodic synchronization operation.

6. A method of clam 2 further comprising informing the server data processing system that at least one of said at least one client data processing system should receive said request for said second file size before determining the latest file size value and receiving said second file size in response to a request sent from the server data processing system to at least one of the at least one client data processing system.

7. A method of claim 6 further comprising using a token for indicating that said client data processing system should receive said request, wherein said token is requested from the server data processing system by said client data processing system when said client data processing system requires permission to write to the file.

8. A method of claim 2 further comprising sending to said at least one client data processing said determined latest file size value.

9. A method of claim 5 further comprising sending to said at least one client data processing said determined latest file size value.

10. A method of claim 1 further comprising maintaining said second file size in association with an ability to change said file size at said at least one client data processing system through a virtual memory access to the file or through a system call access to the file.

11. A method of claim 10 further comprising determining the latest file size value using an end of file contained within a rightmost virtual memory page.

12. A method of claim 1 further comprising determining the latest file size value in response to a request for the file size received at the server data processing system from the at least one client data processing system, and returning said latest file size value to said at least one client data processing system.

13. A method of claim further comprising obtaining information, by the server data processing system, about said second file size from said at least one client data processing system by sending at least one request for said second file size to said at least one client data processing system before making a determination of said latest file size value.

14. A method of maintaining a first file size of a file residing at a server data processing system, said server data processing system connected to at least on client data processing system through a means of communication, said method comprising:
    maintaining, by one of said client data processing systems having permission from the server data processing system to write to the file, a second file size of the file in association with said write permission;
    updating said second file size when said client data processing system modifies said file; and
    combining, by the server data processing system, information from the client data processing having write permission for the file and the rightmost page of the file to determine a latest file size.

15. A method of claim 14 further comprising sending periodically, by one of said client data processing systems having mapped access to the file, to the server data processing system the modifications to the file whereby the server data processing system is notified when the client data processing system has extended a local file through mapped access.

16. A method of claim 14 wherein the step of combining is performed by the server data processing system in response to a request for the file size by one of said client data processing systems.

17. A method of claim 14 further comprising adjusting, at the server data processing system, the latest file size to correspond to the rightmost page of the file if the server performs a periodic synchronization operation of the file.

18. A method of clam 14 further comprising adjusting, at the server data processing system, the latest file size to correspond to the right-most page of the file after a last close of the file.

19. A method of claim 14 further comprising adjusting, at the server data processing system, the latest file size to correspond to the rightmost page during a client data processing system generated request to store, at the server data processing system, all changes made at one of said client data processing systems which generated said request to store.

20. A method of claim 19 wherein the adjusting step is performed during a f_sync operation.

21. A method of maintaining a modify time of a file residing at a server data processing system, said server data processing system connected to at least one client data processing system through a means of communication, said method comprising:
    tracking, by the server data processing system, a modify count and a corresponding modify time for the file;
    incrementing, by the client data processing system having a write permission, the modify count when the client data processing system modifies the file;
    sending to the server data processing system, from the client data processing system, a sent modify count equal to the modify count during a periodic synchronization operation;
    comparing, by the server data processing system, the sent modify count with the tracked modify count to determine if the file had been modified while the client data processing system had the write permission; and updating, by the server data processing system, the corresponding tracked modify time to the sent modified time if the server determines from the comparison that the file had been modified.

22. A method of maintaining a modify time of a file at a server data processing system, said server data processing system connected to at least one client data processing system through a means of communication, said method comprising:
    maintaining a modify count, a corresponding modify time, and a permission from the server data processing system to write to the file by the client data processing system;
    tracking, by the server data processing system, a modify count for the file;
    incrementing, by the client data processing system having the write permission, the modify count when the client data processing system modifies the file;
    sending to the server data processing system, from the client data processing system, a sent modify count equal to the modify count in response to a request form the server data processing system;
    comparing, by the server data processing system, the sent modify count with the tracked modify count to determine if the file had been modified while the client data processing system had the write permission; and
    updating, by the server data processing system, the tracked modify time to the sent modified time if the server determines from the comparison that the file had been modified.

23. A method of maintaining an access time of a file at a server data processing system, said server data processing system connected to at least one client data processing system through a means of communication, said method comprising:
   maintaining a client access time and a permission from the server data processing system to read the file by any one of at least one client data processing systems;
   incrementing, by the client data processing system having read permission, the client access time when the client data processing system accesses the file;
   sending periodically, from each one of said client data processing systems having the read permission to the server data processing system the corresponding client access time;
   comparing, by the server data processing system, the sent client access time with a recorded access time at the server data processing system to determine if the file had been accessed while the client data processing system had the read permission; and updating, by the server data processing system, the recorded access time with the sent client access time if the server determines from the comparison that the file had been accessed.

24. A method of claim 23 wherein the sending periodically is performed by each of the client data processing systems having read permission through a snyc_attr message.

25. A computer program for use in a server data processing system having means for maintaining a first file size of a file residing at a server data processing system, said server data processing system connectable to at least one client data processing system through a means of communication, said computer program comprising:
   means for requesting, from one of said client data processing systems having permission from the server data processing system to write to the file, a second file size maintained by said client data processing system in conjunction with said write permission and updateable when said client data processing system modifies the file;
   means for periodically receiving a rightmost page of the file from said at least one of said client data processing systems extending the file through mapped access; and
   means for combining, by the server data processing system, the second updateable file size from the client data processing having write permission for the file and the rightmost page of the file to determine a latest file size maintained at said server data processing system.

* * * * *

UNITED STATES PATENT AND TRADEMARK OFFICE
CERTIFICATE OF CORRECTION

PATENT NO. : 5,113,519
DATED : May 12, 1992
INVENTOR(S) : Donavon W. Johnson et al It is certified that error appears in the above-indentified patent and that said Letters Patent is hereby corrected as shown below:

On the title page item [54], delete "INTENANCE" and insert --MAINTENANCE--;

Col. 1, line 1, delete "INTENANCE" and insert --MAINTENANCE--;

Col. 7, line 22, delete "$f_{13}sync$" and insert --$f\_sync$--;

Col. 13, line 7, delete "$revoke_{13}tkn$" and insert --$revoke\_tkn$--;

Col. 16, line 65, delete "clam" and insert --claim--;

Col. 17, line 32, after "claim" insert --1--;

line 41, delete "on" and insert --one--; and

Col. 19, line 15, after "permission" insert --,--.

Signed and Sealed this

Twenty-eighth Day of November 1995

Attest:

BRUCE LEHMAN

*Attesting Officer*  *Commissioner of Patents and Trademarks*